(12) United States Patent
Fujii et al.

(10) Patent No.: US 11,745,287 B2
(45) Date of Patent: Sep. 5, 2023

(54) METAL MATERIAL SOLID-PHASE BONDING METHOD AND SOLID-PHASE BONDING DEVICE

(71) Applicant: OSAKA UNIVERSITY, Suita (JP)

(72) Inventors: Hidetoshi Fujii, Suita (JP); Yoshiaki Morisada, Suita (JP); Huihong Liu, Suita (JP); Yasuhiro Aoki, Suita (JP); Masayoshi Kamai, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 354 days.

(21) Appl. No.: 16/981,001

(22) PCT Filed: Feb. 22, 2019

(86) PCT No.: PCT/JP2019/006719
§ 371 (c)(1),
(2) Date: Sep. 15, 2020

(87) PCT Pub. No.: WO2019/181360
PCT Pub. Date: Sep. 26, 2019

(65) Prior Publication Data
US 2021/0107087 A1    Apr. 15, 2021

(30) Foreign Application Priority Data

Mar. 20, 2018 (JP) ................................. 2018-053392

(51) Int. Cl.
*B23K 20/00* (2006.01)
*B23K 20/02* (2006.01)
*B23K 103/04* (2006.01)

(52) U.S. Cl.
CPC ........ *B23K 20/023* (2013.01); *B23K 2103/04* (2018.08)

(58) Field of Classification Search
CPC .... B23K 20/12; B23K 20/129; B23K 35/004; B23K 20/023; B23K 20/028;
(Continued)

(56) References Cited

U.S. PATENT DOCUMENTS 6,078,031 A * 6/2000 Bliault ................. B23K 13/025
                                                        219/616
9,227,267 B1 * 1/2016 Dion ...................... B32B 15/015
(Continued)

FOREIGN PATENT DOCUMENTS

JP    2001-287051 A    10/2001
JP    2001-321951 A    11/2001
(Continued)

OTHER PUBLICATIONS

International Search Report dated May 14, 2019, issued in counterpart International Application No. PCT/JP2019/006719 (2 pages).

*Primary Examiner* — Erin B Saad
(74) *Attorney, Agent, or Firm* — WHDA, LLP

(57) ABSTRACT

To provide a solid phase welding method and a solid phase welding apparatus which are possible to accurately control the welding temperature, to lower the welding temperature and to achieve a solid phase welding of the metallic materials. The present invention provides a solid phase welding method for metallic materials comprising, a first step of forming an interface to be welded by abutting end portions of one material to be welded and the other material to be welded and applying a pressure in a direction substantially perpendicular to the interface to be welded, a second step of raising a temperature of the vicinity of the interface to be welded to a welding temperature by an external heating means, wherein the pressure is set to equal to or more than the yield strength of the one material to be welded and/or the other material to be welded at the welding temperature.

10 Claims, 27 Drawing Sheets

(58) Field of Classification Search
CPC .... B23K 20/121; B23K 20/227; B23K 20/24; B23K 2101/20; B23K 2103/04; B23K 35/005; B23K 35/007; B23K 13/025; B23K 20/1205; B23K 20/16; B23K 20/26; B23K 2101/02; B23K 2101/06; B23K 2103/18; B23K 2103/24; B23K 31/02; B23K 35/002
See application file for complete search history.

(56) References Cited

U.S. PATENT DOCUMENTS

| | | | |
|---|---|---|---|
| 9,566,662 B2 * | 2/2017 | Kimura | B23K 20/129 |
| 10,022,816 B2 * | 7/2018 | Okada | B23K 20/12 |
| 11,465,243 B2 * | 10/2022 | Mann | B23K 35/004 |
| 2014/0050519 A1 * | 2/2014 | Oiwa | F01D 5/34 |
| | | | 228/112.1 |
| 2018/0043467 A1 * | 2/2018 | Huysmans | B23K 20/121 |
| 2020/0023458 A1 * | 1/2020 | Fujii | B23K 20/129 |

FOREIGN PATENT DOCUMENTS

| | | |
|---|---|---|
| JP | 2002-294404 A | 10/2002 |
| JP | 2005-254244 A | 9/2005 |
| JP | 2015-164738 A | 9/2015 |
| JP | 2017-531563 A | 10/2017 |
| WO | 2018/168687 A1 | 9/2018 |

* cited by examiner

METAL MATERIAL SOLID-PHASE BONDING METHOD AND SOLID-PHASE BONDING DEVICE

TECHNICAL FIELD

The present invention relates to a solid phase welding method for welding metallic materials to each other and a solid phase welding apparatus which can be suitably used in the solid phase welding method.

BACKGROUND ART

Along with the increase in strength of metallic materials such as steel and aluminum alloys, the deterioration of strength at a joint portion which determines mechanical properties of a joint structure has become a serious problem. On the other hand, in recent years, a solid phase welding method in which the maximum reaching temperature during welding does not reach the melting point of the material to be welded and the strength decrease at the welding portion is small as compared with the conventional melt welding has attracted attention, and the practical application is rapidly proceeding.

In particular, friction welding (FW: Friction Welding) for rotatably sliding the cylindrical metal members to each other and linear friction welding (LFW: Linear Friction Welding) for sliding the metal members to each other in a linear locus can be easily applied to high melting point metal and the practical use in various industries has been promoted since there is no need to use a tool like friction stir welding (FSW: Friction Stir Welding).

For example, Japanese Unexamined Patent Publication No. 2001-287051 proposes a method of providing a friction welded joint of a high tensile strength steel material in which the hardness is substantially uniform over the rotation radial direction of the friction welding.

Friction welded joint of the high tensile strength steel material described in Patent Document 1 has a crystal grain size of 2 µm or less of the microstructure, together with the tensile strength is 60 kgf/mm² or more, the carbon content is 0.1 wt % or less of the friction welded joint of the high tensile strength steel material, and the carbon content of the high tensile strength steel material is suppressed as low as 0.1 wt %. With this low carbon content of 0.1 wt % or less, the outer peripheral portion of the high tensile strength steel material is restrained from changing its structure and hardening is restrained at the time of friction welding.

Patent Document 2 (Japanese Unexamined Patent Publication No. 2002-294404) provides a high carbon steel material suitable for friction welding and a method of manufacturing the same, in which the increase in hardness of the friction welded portion is small.

The member (steel material) to be friction welded is subjected to an extremely rapid heating and cooling cycle in which the member (steel material) is rapidly heated to a temperature just below the melting point under a high pressure in about 10 seconds and then rapidly cooled from 1200° C. or more. Therefore, the crystal grains of the member are coarsened at the time of rapid heating, and are transformed into a hard martensite phase by rapid cooling thereafter, thereby increasing the hardness of the welded portion.

On the other hand, in the high carbon steel material described in Patent Document 2, the coarsening of austenite crystal grains of the high carbon steel material is prevented by containing 0.005% or more of Nb in a solid solution state, the austenite grain size number measured after heat treatment at 800° C. for 5 minutes by an oxidizing method according to the JIS G 0551 regulation can be set to 9 or more, and the increase in hardness of the friction welded portion can be suppressed.

Further, with respect to linear friction welding, for example, Patent Document 3 (Japanese Unexamined Patent Publication No. 2015-164738) discloses a friction welding apparatus for friction welding the one member to the other member by repeatedly relative movement of them in a state of contacting one member with the other member on the same locus. According to a stop command of relative movement with respect to the other member of the one member, the one member from the occurrence of the stop command to the other member the relative movement of the one member during a period until the one member moves relative to the locus once relative to the other member. Friction welding apparatus is disclosed, characterized in that it comprises a stop means for stopping the relative movement with respect to the other member.

In the friction welding device described in Patent Document 3, when friction welding is performed by repeatedly moving one member in contact with the other member on the same trajectory and by friction welding, if a stop command for relative movement is generated at which timing, it is possible to easily specify whether the relative movement of the 2 members is just stopped at the timing at which the two members are in the appropriate welding state.

PRIOR ART

Patent Document

[Patent Document 1] Japanese Unexamined Patent Publication No. 2001-287051
[Patent Document 2] Japanese Unexamined Patent Publication No. 2002-294404
[Patent Document 3] Japanese Unexamined Patent Publication No. 2015-164738

SUMMARY OF THE INVENTION

Problem to be Solved by the Invention

However, it is necessary that the friction welded joint disclosed in Patent Document 1 is a high tensile strength steel material having a carbon content of 0.1 wt % or less, and the objective material to be welded is limited to an extremely narrow range.

Also, in the friction welded joint disclosed in Patent Document 2, the composition of a steel material that can be used as the material to be welded is limited. In addition, it is not possible to effectively suppress a decrease in hardness (strength) in the heat affected zone.

In addition, the friction welding method disclosed in Patent Document 3 shortens the period from the generation of the stop command to the stopping of the actuator to control the amount of friction welding, but cannot control the welding temperature which greatly affects the joint characteristics.

In the conventional linear friction welding, softened flashes are discharged from a welded interface so that newly developed surfaces are contacted with each other to achieve the welding, and basically, it is necessary to sufficiently raise the temperature (soften) in the vicinity of the interface to be welded by frictional heat. That is, it is difficult to accurately set a desired welding temperature and, in particular, it is more difficult to lower the welding temperature.

In addition, in the friction welding and the linear friction welding, it is necessary to slide the materials to be welded together in a state of applying a high pressure, there is an essential problem that the welding apparatus becomes complicated and large. This problem limits the substantial applicability of these welding methods.

In view of the problems in the prior art as described above, an object of the present invention is to provide a solid phase welding method and a solid phase welding apparatus which are possible to accurately control the welding temperature, to lower the welding temperature and, in addition, to achieve a solid phase welding of the metallic materials to be welded to each other without sliding them.

Means to Solve the Problems

The present inventors carried out extensive researches on the solid phase welding method for the metallic materials in order to achieve the above object and, as a result, have found that it is extremely effective to locally heat only the vicinity of the interface to be welded while applying a pressure corresponding to the welding temperature to the material to be welded and reached the present invention.

The remarkable feature of the present invention is, when contacting the materials to be welded to each other, not to apply a small pressure simply in order to ensure the fixation of the materials to be welded and the close contact of the interface to be welded but to apply a large pressure for the purpose of determining the welding temperature. The mechanism of the welding temperature determination is schematically shown in FIG. 1. FIG. 1 is a graph schematically showing the relation between yield stress and the temperature of the metallic material. The yield stress of the metallic material varies depending on the temperature, and the relation between the yield stress and the temperature varies for each metallic material.

Here, for example, when butting and welding the metallic materials to each other, welding is achieved by sufficiently softening the vicinity of the interface to be welded, by forming newly developed surfaces in the interface to be welded, and by discharging flashes from the interface to be welded. Focusing on the deformation resistance (yield stress) of the metallic material as the material to be welded shown in FIG. 1, it is low when the temperature is high and is high when the temperature is low. That is, when applying a pressure to the vicinity of the interface to be welded, the deformation or the discharge or flashes is started at a low temperature by applying a higher pressure, so that the welding is achieved at a low temperature as a result. In FIG. 1, specifically, when a pressure $P_1$ is applied to the interface to be welded, the welding temperature of the material A becomes $t_1$ and, when the pressure is increased to $P_2$, the welding temperature drops to $t_2$. Also, with respect to the material B, by increasing the pressure from $P_1$ to $P_2$, the welding temperature drops from $T_1$ to $T_2$.

That is, the present invention provides a solid phase welding method for metallic materials comprising, a first step of forming an interface to be welded by abutting end portions of one material to be welded and the other material to be welded and applying a pressure in a direction substantially perpendicular to the interface to be welded, a second step of raising a temperature of the vicinity of the interface to be welded to a welding temperature by an external heating means, wherein the pressure is set to equal to or more than the yield strength of the one material to be welded and/or the other material to be welded at the welding temperature.

In the conventional friction welding and linear friction welding, welding is achieved by sufficiently soften the vicinity of the interface to be welded by friction heat and discharging a large amount of flashes from the interface to be welded. Here, in general, the welding temperature is considered to rise by increase of the sliding speed of the materials to be welded, the pressurizing force between the materials to be welded, and the welding time.

However, focusing on the deformation resistance of the metallic material as the material to be welded, the deformation resistance is low when the temperature is high and is high when the temperature is low. That is, when applying a pressure to the vicinity of the interface to be welded, flashes are discharged at a low temperature by applying a higher pressure, so that the welding is achieved at a low temperature as a result. The solid phase welding method for the metallic materials of the present invention is based on the above mechanism, which is clarified by the present inventors and, since the deformation resistance and the temperature has a substantially constant relationship in a particular metallic material, it is possible to accurately control the welding temperature by the pressure applied to the vicinity of the interface to be welded.

Specifically, in the first step, an interface to be welded is formed by contacting the materials to be welded to each other and, in a direction substantially perpendicular to the interface to be welded, a pressure equal to or above the yield strength is applied to one material to be welded and/or the other material to be welded at a desired welding temperature. Thereafter, by raising the temperature of the vicinity of the interface to be welded in the second step, the vicinity of the interface to be welded is deformed at the moment of reaching the welding temperature set in the first step and, the newly developed surfaces of one material to be welded and the other material to be welded are in contact with each other (flashes are discharged depending on conditions), so that the welding is achieved. In other words, the pressure applied in the first step becomes a trigger to make it possible to accurately control the welding temperature. It is preferable that the pressure applied in the first step is equal to or more than the yield strength of the one material to be welded and/or the other material to be welded and equal to or less than the tensile strength of the one material to be welded and/or the other material to be welded at the desired welding temperature.

Here, the timing of applying a pressure in the first step may be before reaching the desired welding temperature (the temperature at which the vicinity of the interface to be welded is deformed by the pressure). For example, in the case where the temperature raising rate in the second step is slow, etc., there maybe also a case where the timing of applying a pressure in the first step is after the start of the second step.

The external heating means used in the second step is not particularly limited as long as the effect of the present invention is not impaired, and various conventionally known external heating means can be used. Here, the external heating means, electric heating, laser heating and high-frequency heating, and heatings by means of arc, plasma, flame and the like can be mentioned, and it is preferable to use the electric heating. By carrying out the electric heating under appropriate conditions, it is possible to raise the temperature only in the vicinity of the interface to be welded in an extremely short time. Incidentally, by using a capacitor, it is possible to flow an electric current with a high density in an extremely short time.

Further, in the solid phase welding method for metallic materials of the present invention, it is important to uniformly raise the temperature of the entire interface to be welded and, for this purpose, each of the above external heating means may be used in combination. In addition, an external cooling means such as a liquid $CO_2$ or a liquid nitrogen supply and an air blow may be used in combination as required.

In the solid phase welding method for metallic materials of the present invention, it is preferable that an electric heating is used as the external heating means and a heat generating material having an electrical resistance value higher than one material to be welded and the other material to be welded is provided on the interface to be welded. The heat generating material in the form of thin film or powder may be provided on the interface to be welded and an end portion of the material to be welded may be intentionally oxidized. By providing these heat generating materials to the interface to be welded, it is possible to efficiently raise the temperature of the vicinity of the interface to be welded.

Further, in the solid phase welding method for metallic materials of the present invention, in the second step, it is preferable to set the current density used for the electric heating so that the duration time until the sum of the burn-off lengths of the one material to be welded and the other material to be welded reaches 2 mm becomes 3 seconds or less and, more preferably, 2 seconds or less. Depending also on the size and the shape of the material to be welded, in the case where the burn-off length is less than 2 mm, the deformation of the vicinity of the interface to be welded is usually insufficient and it is difficult to obtain a good joint. On the other hand, when the welding time is prolonged, a heat affected zone is easily formed in the welded portion and the mechanical properties of the joint is lowered. On the contrary, by setting the current density so that the duration time until the sum of the burn-off length reaches 2 mm becomes 3 seconds or less (more preferably 2 seconds or less), it is possible to simultaneously achieve the deformation of the welded interface and the suppression of the heat affected zone.

Further, in the solid phase welding method for metallic materials of the present invention, it is important to deform locally the vicinity of the interface to be welded and to closely contact the newly developed surfaces of the one material to be welded and the other material to be welded to each other. For example, when each of the one material to be welded and the other material to be welded is a round rod having a diameter of D, it is preferable that the protruding length L of the protruded portion of these materials to be welded which can be deformed is set to 0.5D~2D. By setting the protruding length L to 0.5D or more, it is possible to form a sufficient newly developed surface in the interface to be welded, and by setting the protruding length L to 2D or less, it is possible to locally deform only the vicinity of the interface to be welded. Incidentally, by setting the area A of the welded interface after the welding process to 1.5 times or more of the initial area $A_0$ of the interface to be welded, a sufficient newly developed surface is formed and a good welded portion can be obtained.

Further, in the solid phase welding method for metallic materials of the present invention, it is preferable that the current density is set to be equal to or higher than 50 A/mm², and more preferably equal to or higher than 70 A/mm². In order to suppress the formation of the heat affected zone at the welded portion and to form a good welded interface, it is preferable to shorten the welding time, and by rapidly raising the temperature only in the vicinity of the interface to be welded by heating with the current density of 50 A/mm or more (more preferably 70 A/mm² or more), a good joint can be obtained.

Further, it is preferable to flow an electric current having a high current density only to the region of the protruding length L set to 0.5 D to 2D. By increasing the current density of the region than the other regions, it is possible to efficiently increase the temperature only in the vicinity of the interface to be welded while suppressing the temperature rise of the entire material to be welded.

Further, in the solid phase welding method for metallic materials of the present invention, it is preferable to set the pressure equal to the flow stress of the one material to be welded and/or the other material to be welded at the welding temperature. By setting the pressure applied substantially perpendicular to the interface to be welded equal to the flow stress of the one material to be welded and/or the other material to be welded, the continuous deformation or discharge of flashes in the vicinity of the interface to be welded is started at the welding temperature set, and a stable welding can be achieved with a minimum pressure.

Further, in the solid phase welding method for metallic material of the present invention, it is preferable that the one material to be welded and/or the other material to be welded is an iron-based metal, and it is more preferable that the welding temperature is equal to or lower than point $A_1$ of the iron-based metal.

The welding method for metallic materials of the present invention is a solid phase welding and can suppress a decrease in mechanical properties of the iron-based metallic welded portion which is noticeably observed in general melt welding. In the present invention, the iron-based metal means a metal mainly containing iron in composition, and includes various steels, cast iron, and the like, for example. Further, for the iron-based metal, there is a case where brittle martensite is formed by phase transformation and the welding becomes difficult and the welded portion becomes brittle but, by setting the welding temperature to be equal to or below point $A_1$, the phase transformation does not occur and the formation of brittle martensite can be completely suppressed.

Further, in the solid phase welding method for metallic materials of the present invention, the one material to be welded and/or the other material to be welded is preferably titanium or titanium alloy, and the welding temperature is preferably set to be equal to or below the β transus temperature of titanium or titanium alloy.

The welding method for metallic materials of the present invention is a solid phase welding and can suppress a decrease in mechanical properties of the welded portion which is noticeably observed in general melt welding. By setting the welding temperature to be equal to or lower than the β transus temperature of titanium or titanium alloy, the structure of the welded portion can be made fine equiaxed grains, and a welded portion having both high strength and toughness can be formed.

Furthermore, in the solid phase welding method for metallic materials of the present invention, when using the electric heating as the external heating means, it is preferable that the area S1 of the interface to be welded is smaller than the cross-sectional area S2 of the one material to be welded and the other material to be welded in the direction substantially perpendicular to the direction of application of the pressure. The cross-sectional area S2 is a cross-sectional area of a cross section which is substantially parallel to the interface to be welded in the material to be welded, and the area S1 of the interface to be welded is smaller than the cross-sectional area of any cross section of the material to be welded. As a result, the electric current path can be restricted at the interface to be welded and the heat generation can be facilitated only in the vicinity of the interface to be welded. In addition, by reducing the area to be welded, it is possible to reduce the load and electric current required for the welding.

Here, at the end portion of the one material to be welded and/or the other material to be welded, it is preferable that the area S1 is continuously reduced in the direction toward to the interface to be welded. When the end portion of the material to be welded has a so-called tapered shape, the electric current path can be restricted efficiently at the interface to be welded and the heat generation can be facilitated only in the vicinity of the interface to be welded. Here, more specifically, the taper angle to the side surface of the material to be welded is preferably set to 30 to 60°, and more preferably set to 40 to 50°. Buckling of the material to be welded can be suppressed by setting the taper angle to 60° or less and the heating band can be sufficiently narrowed by setting the taper angle to a 30° or more.

When the end portion of the material to be welded is a tapered shape, the area of the interface to be welded is gradually changed in the welding process and it becomes slightly difficult to control the value of the applied pressure for the desired welding temperature. But, by reducing the irregularity of the interface to be welded by buffing or the like, a good joint without an unwelded portion can be obtained even with small burn-off lengths (even in a condition where the change in the area of the interface to be welded is small). Incidentally, in order to control the welding temperature or the like more accurately, by using various methods known in the art, the change in the area of the interface to be welded is measured and fed back to the pressure to be applied.

In addition, the present invention provides a solid phase welding apparatus for metallic materials comprising, a pressurizing mechanism for bringing one material to be welded into contact with the other material to be welded to form an interface to be welded, and for applying a pressure to the interface to be welded in a direction substantially perpendicular to the interface to be welded, and a power supply mechanism for flowing electric current from the one material to be welded to the other material to be welded via the interface to be welded to raise the temperature of the vicinity of the interface to be welded, wherein the pressure can be controlled in a range of 100 to 450 MPa by the pressurizing mechanism, and the temperature of the vicinity of the interface to be welded can be raised to 500 to 1000° C. by the power supply mechanism.

The solid phase welding apparatus for metallic materials of the present invention is a simple one having the basic configuration of a pressurizing mechanism and a power supply mechanism, and there is no need to have a rotation mechanism which the friction welding apparatus has and a linear sliding mechanism which the linear friction welding apparatus has. As a result, the structure can be simplified and the price can be greatly reduced.

Here, for example, a conventional resistance spot welding machine or a seam welding machine can also achieve power supply and pressure application to the region to be welded. The power supply is a means for raising the temperature higher for the purpose of melting the material to be welded, whereas, the pressure application is can be remained to have a low value to the extent that ensures close contact between the materials to be welded.

On the other hand, the solid phase welding apparatus for metallic materials of the present invention can also be manufactured based on a conventional resistance spot welding machine or seam welding machine. For example, by using a high-speed inverter control power supply or the like to the power supply of the resistance spot welder, to enable rapid heating of the vicinity of the interface to be welded with ultra-short pulses, in addition, to enable setting of the pressure applied by the electrode higher, a solid phase welding apparatus for metallic materials of the present invention can be obtained. Here, the servo press device of the mechanical type (electric type) has a fast response speed and can set the movement of the slide to have any speed and, therefore, can be suitably used as a pressing mechanism of the solid phase welding apparatus for metallic materials of the present invention.

In the solid phase welding apparatus for metallic materials of the present invention, it is preferable that, by setting of the desired welding temperature, the pressure becomes equal to the flow stress of the one material to be welded and/or the other material to be welded at the welding temperature. Here, the flow stress at each temperature is preferably measured in a state close to the situation occurring during actual welding and, for example, it is possible to use a value obtained in the high-temperature tensile test at each temperature. Since the flow stress depends on the strain rate, it is preferable to make the tensile speed of the high-temperature tensile test close to the situation in the welding as much as possible.

Temperature dependence of the flow stress is inherent to each metallic material and, if the solid phase welding apparatus has a database containing the flow stress at each temperature, it is possible to determine the corresponding pressure by setting the type and the desired welding temperature of the metallic material. Incidentally, it is preferable to record or store a database of at least iron-based material and titanium alloy in the solid phase welding apparatus.

Furthermore, the present invention provides, a joint comprising one material to be welded and the other material to be welded, both being welded with each other by the solid phase welding method for metallic materials of the present invention, wherein each of the one material to be welded and the other material to be welded is a rod-shaped, and the length of the deformation region of the welded portion in the longitudinal direction of the joint is shorter than the width in the lateral direction of the one material to be welded and/or the other material to be welded.

In the joint of the present invention, only the welded portion is locally deformed and the influence of the welded portion, which is a singular region in the joint, is minimized. For example, in the case of a joint in which bar members having a diameter of 10 mm are welded, the length of the deformed region of the welded portion in the longitudinal direction of the joint is shorter than 10 mm.

Effect of the Invention

According to the present invention, it is possible to provide a solid phase welding method for metallic materials and a solid phase welding apparatus for metallic materials, which enable to accurately control the welding temperature, to lower the welding temperature and, in addition, to achieve a solid phase welding without sliding the materials to be welded to each other.

DETAILED DESCRIPTION OF THE INVENTION

Figure 1:
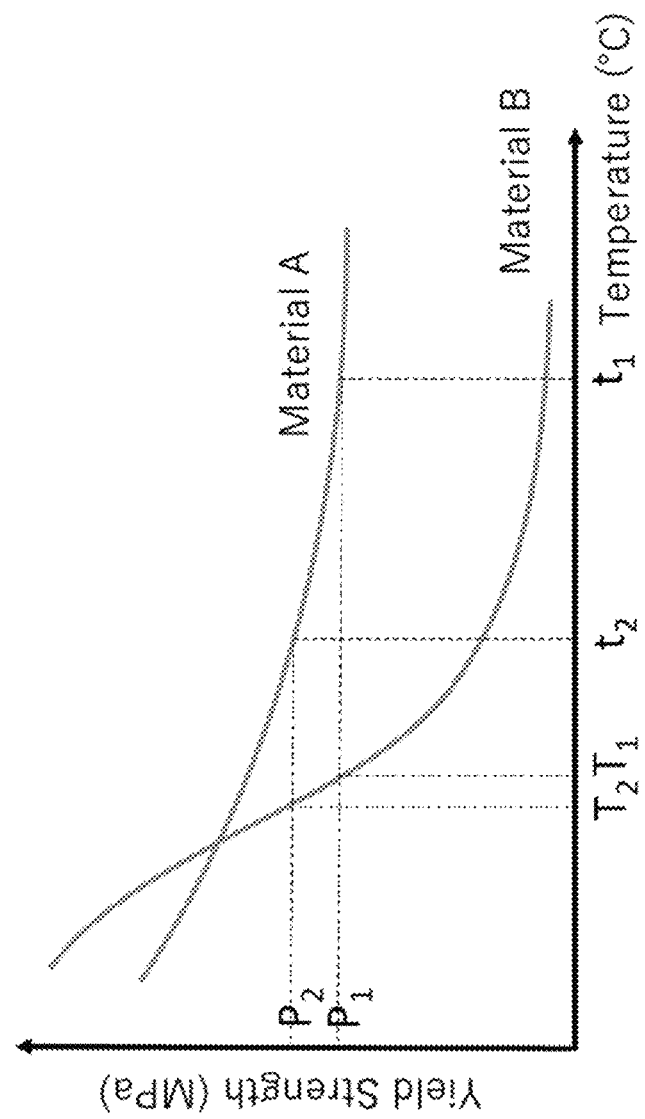
FIG. 1 is a conceptual diagram showing a mechanism of the welding temperature determination in the present invention.

Hereinafter, typical embodiments of a solid phase welding method for metallic materials and a solid phase welding apparatus for metallic materials according to the present invention will be described in detail with reference to the accompanying drawings, but the present invention is not limited thereto. In the following description, the same or corresponding components are designated by the same reference numerals, and a repetitive description may be omitted. In addition, since the drawings are for conceptually explaining the present invention, the dimensions and ratios of the components shown in the drawings may differ from actual ones.

(1) Solid Phase Welding Method for Metallic Materials

The solid phase welding method for metallic materials according to the present invention includes a first step of forming an interface to be welded and simultaneously applying a pressure necessary for welding, and a second step of raising the temperature of the interface to be welded. Hereinafter, each step will be described in detail.

(1-1) First Step (Pressure Application Step)

In the first step, an interface to be welded is formed and simultaneously a pressure necessary for welding is applied, and a welding temperature is determined. In the melt welding in which a material to be welded is melt, the pressure applied to the material to be welded is intended to contact closely the materials to be welded to each other and the pressure does not affect the welding temperature. On the contrary, when the welding is conducted in the solid phase without melting the vicinity of an interface to be welded, it is possible to accurately determine the welding temperature by the pressure.

Figure 2:
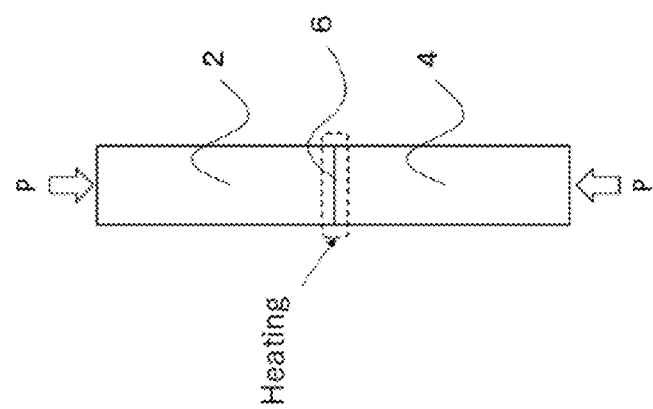
FIG. 2 is a schematic diagram showing an embodiment of a solid phase welding method for metallic materials of the present invention.

A schematic view of a solid phase welding method for metallic materials of the present invention is shown in FIG. 2. In the first step, the one material to be welded 2 and the other material to be welded 4 are brought into contact with each other to form the interface to be welded 6 and, then, the pressure P, which is equal to or higher than the yield strength of the one material to be welded 2 and/or the other material to be welded 4 at a desired welding temperature is applied onto the interface to be welded 6 in the substantially perpendicular direction. Here, it is preferable that the end surface of the one material to be welded 2 and the other material to be welded 4, which form the interface to be welded 6, are made smooth in their surfaces and, for example, it is preferable to carry out buffing or the like on their surfaces. By closely contacting the end surfaces to each other, it is possible to suppress the formation of defects (unwelded portion) at the welded interface. On the other hand, from the viewpoint of heat generation, a small irregularity can be formed on the end surfaces of the one material to be welded 2 and the other material to be welded 4.

By setting the pressure P to be equal to or higher than the yield stress of one of material to be welded 2 and/or the other of material to be welded 4 at the welding temperature desired, it is possible to control the welding temperature. Here, by setting the pressure P to be equal to or higher than the yield stress of the material to be welded, the deformation and the discharge of flashes are started in the vicinity of the interface to be welded 6 and, when the pressure P is further increased, the deformation and the discharge of flashes are accelerated. Since the yield stress at a particular temperature is substantially constant depending on the material to be welded, it is possible to realize a welding temperature corresponding to the set pressure P.

Figure 3:
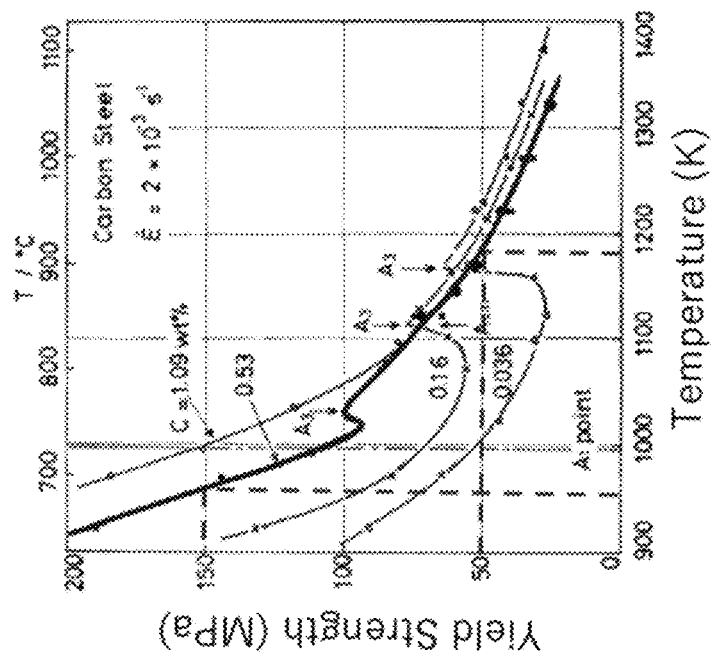
FIG. 3 is a graph showing the deformation stress (yield stress) of the carbon steel at each temperature.

As a specific example, the deformation stress (yield stress) of the carbon steel at each temperature is shown in FIG. 3. It is noted that FIG. 3 is a graph described in "Iron and steel, 67 (1981) No. 11, page 140". As shown in FIG. 3, the yield stress at a particular temperature is approximately constant depending on the material.

That is, when the pressure P at the time of welding is set high, the material to be welded having a higher yield strength can be deformed and the welding temperature can be lowered. Further, as shown in FIG. 3, since the yield stress at a specific temperature is substantially constant depending on the material, it is possible to control the welding temperature very accurately. For example, in the case that the carbon content is 0.53 wt %, if the pressure P is set to 150 MPa, it is possible to control the welding temperature to be 950° C. and, if the pressure P is set to 50 MPa, it is possible to control the welding temperature to be 1180° C.

Here, it is preferable that the pressure P is set to be equal to the flow stress of the one material to be welded 2 and/or the other material to be welded 4 at the desired welding temperature. By setting the pressure P to be applied substantially perpendicular to the interface to be welded 6 to be equal to the flow stress of the one material to be welded 2 and/or the other material to be welded 4, the deformation and the discharge of flashes is started surely and continuously at the set welding temperature in the vicinity of the interface to be welded 6, and it is possible to achieve a stable welding with a minimum pressure.

The material for the one material to be welded 2 and the other material to be welded 4 is not particularly limited as long as it does not impair the effect of the present invention. It is sufficient that the material has a metallic phase that can be metallurgically welded and, iron-based metal or titanium or titanium alloy are preferable. Iron-based metal, titanium or titanium alloy has a sufficient strength at room temperature and, even when the one material to be welded 2 and/or the other material to be welded 4 has a thin region or a narrow region, iron-based metal, titanium or titanium alloy has a mechanical properties that can withstand the application of the pressure P in the first step. As a result, by using these metals for the one material to be welded 2 and/or the other material to be welded 4, it is possible to prevent deformation or the like at unnecessary locations during the welding process. In addition, the welding method according to the present invention is a solid phase welding and can suppress the deterioration of the mechanical properties of the welded portion, which is remarkably observed in general melt welding.

Further, the shape and size of the one material to be welded 2 and the other material to be welded 4 are not particularly limited as long as they do not impair the effect of the present invention and they can realize the desired pressure, temperature rise and the like by the welding apparatus, but it is preferable that the area of the interface to be welded 6 is set to be smaller than the cross-sectional area of the one material to be welded 2 and/or the other material to be welded 4. By setting the area of the interface to be welded 6 to be relatively small, the current density can be increased in the second step and, in addition, the temperature distribution of the interface to be welded 6 can be uniform.

(1-2) Second Step

In the second step, in a state of applying the pressure P substantially perpendicular to the interface to be welded 6, the temperature in the vicinity of the interface to be welded 6 is raised by an external heating means to the welding temperature.

The method of raising the temperature of the vicinity of the interface to be welded 6 by the external heating means is not particularly limited as long as it does not impair the effect of the present invention and, various conventionally known external heating means can be used. The external heating means, electric heating, laser heating and high-frequency heating, and beatings by means of arc, plasma, flame and the like can be mentioned, and it is preferable to use the electric heating. By carrying out the electric heating under appropriate conditions, it is possible to raise the temperature only in the vicinity of the interface to be welded in an extremely short time. Incidentally, by using a capacitor, it is possible to flow a current with a high density in an extremely short time.

Figure 4:
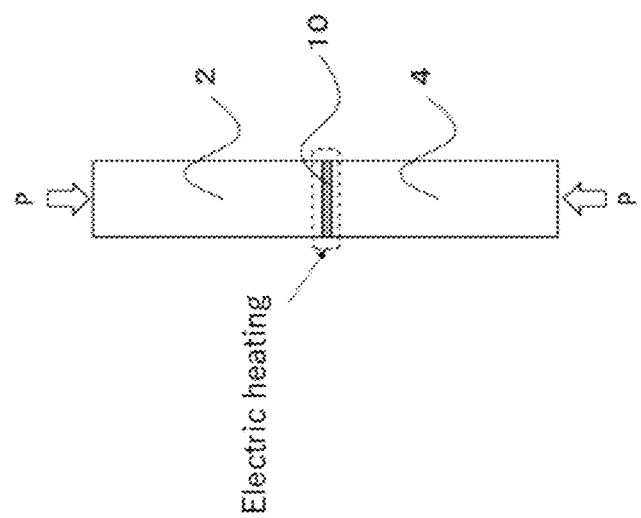
FIG. 4 is a schematic diagram of a solid phase welding method for metallic materials of the present invention when using a heat generating material.

Further, it is preferable that an electric heating is used as the external heating means and a heat generating material having an electrical resistance value higher than the one material to be welded 2 and the other material to be welded 4 is provided on the interface 6 to be welded. FIG. 4 shows a schematic view of the welding method for metallic materials of the present invention when using the heat generating material. Although FIG. 4 shows the heat generating material 10 in the form of a thin film, the heat generating material 10 may be a powder or granular or the like, the end portion of the one material to be welded 2 and/or the other material to be welded 4 can be intentionally oxidized, for example. By providing the interface to be welded 6 with the heat generating material, it is possible to efficiently raise the temperature of the vicinity of the interface to be welded 6. Incidentally, as the heat generating material 10, an insulator slightly imparted with electrical conductivity, an insulator having a partially penetrating region, and the like may be used. Further, the interface to be welded may be provided with the carbon material.

When using an iron-based material for the one material to be welded 2 and/or the other material to be welded 4, it is possible to use Mn, V, Cr, high alloy steel and the like for the heat generating material 10. In addition that the electrical resistance value of Mn is higher than Fe, an all proportional (complete) solid solution can be obtained when using Mn and γ-Fe. Further, the electrical resistance value of V and Cr are higher than that of Fe, and an all proportional (complete) solid solution can be obtained when using V and Cr and α-Fe. Further, the high alloy steel by alloying, higher electrical resistance value than Fe, high alloy steel and Fe can be total ratio solid solution.

Further, in the solid phase welding method for the metallic materials of the present invention, in the second step, it is preferable to set the current density used for the electric heating so that the duration time until the sum of the burn-off length of one material to be welded and the other material to be welded reaches 2 mm becomes 3 seconds or less and, more preferable, 2 seconds or less. In the case where the burn-off length is less than 2 mm, the deformation of the vicinity of the interface to be welded is usually insufficient in and it is difficult to obtain a good joint. On the other hand, when the welding time is prolonged, a heat affected zone is easily formed in the welded portion and the mechanical properties of the joint is lowered. On the contrary, by setting the current density so that the duration time until the sum of the burn-off length reaches 2 mm becomes 3 seconds or less (more preferably 2 seconds or less), it is possible to simultaneously achieve the deformation of the welded interface and the suppression of the heat affected zone.

Further, the current densities used for the electric heating is preferably equal to or higher than 50 A/mm$^2$, more preferably equal to or higher than 70 A/mm$^2$. In order to suppress the formation of the heat affected zone at the welded portion, it is preferable to shorten the welding time and, by rapidly raising the temperature only in the vicinity of the interface to be welded by heating with the current density of 50 A/mm$^2$ or more (more preferably 70 A/mm$^2$ or more), a good joint can be obtained. Here, by reducing the area of the interface to be welded 6, the current is concentrated on the interface to be welded 6 and the current density can be increased. Further, by covering and binding the periphery of the material to be welded other than vicinity of the interface to be welded with an electrical conductor and by placing an insulator corresponding to the protruding length between the electrical conductors, it is possible to flow a current having a high current density only in the protruding portion of the material to be welded. The initial area $A_0$ of the interface to be welded is preferably set to $\frac{1}{10}$ or less of the area of the electric conductor, more preferably set to $\frac{1}{30}$ or less.

In the solid phase welding method for metallic materials of the present invention, it is preferable that iron-based metal is used for the one material to be welded 2 and/or the other material to the welded 4 and the welding temperature is set to be equal to or lower than point $A_1$ of the iron-based metal. The welding method for metallic materials of the present invention is the solid phase welding and, it is possible to suppress a decrease in mechanical properties of the welded portion of the iron-based metal is noticeably observed in general melt welding. In the present invention, the iron-based metal means a metal mainly containing iron in composition, and includes, for example, various steels, cast iron, and the like. Further, in the iron-based metal is brittle martensite is formed by phase transformation and there is a case where the welding is difficult and the welded portion becomes brittle but, by setting the welding temperature to be equal to or lower than $A_1$, it is possible to completely suppress the formation of brittle martensite since the phase transformation does not occur.

Further, in the solid phase welding method for metallic materials of the present invention, the one material to be welded 2 and/or the other material to be welded 4 is preferably titanium or titanium alloy, and the welding temperature is preferably set to be equal to or below the β transus temperature of titanium or titanium alloy. The welding method for metallic materials of the present invention is a solid phase welding and can suppress a decrease in mechanical properties of the welded portion which is noticeably observed in general melt welding. By setting the welding temperature to be equal to or lower than the β transus temperature of titanium or titanium alloy, the structure of the welded portion can be made fine equiaxed grains, and a welded portion having both high strength and toughness can be formed.

Furthermore, in the solid phase welding method for metallic materials of the present invention, when using the electric heating as the external heating means, it is preferable that the area S1 of the interface to be welded is smaller than the cross-sectional area S2 of the one material to be welded 2 and the other material to be welded 4 in the direction substantially perpendicular to the direction of application of the pressure, at the end portion of the one material to be welded and/or the other material to be welded, it is preferable that the area S1 is continuously reduced in the direction toward to the interface to be welded. The cross-sectional area S2 is a cross-sectional area of a cross section which is substantially parallel to the interface to be welded in the material to be welded, and the area S1 of the interface to be welded is smaller than the cross-sectional area of any cross section of the material to be welded. As a result, the current path can be restricted at the interface to be welded and the heat generation can be facilitated only in the vicinity of the interface to be welded. In addition, by reducing the area to be welded, it is possible to reduce the load and current required for the welding. Further, in this case, without covering and binding the periphery of the welding material other than the vicinity of the interface to be welded with an electrical conductor, the welding can be achieved.

(1-3) Other Welding Conditions

In the solid phase welding method for metallic materials of the present invention, it is necessary to set the welding parameters other than the pressure P and the welding temperature (welding time and burn-off length etc.), but these values are not limited as long as they do not impair the effect of the present invention and can be set appropriately by the shape, size and the like of the material to be welded.

Here, after the temperature of the interface to be welded 6 reaches the desired welding temperature, the timing of unloading the pressure P may be appropriately set and, by unloading after confirming the deformation of the vicinity of the interface to be welded 6 and the discharge of flashes from the interface to be welded 66, it is possible to more reliably obtain a good joint. Incidentally, for the purpose of discharging flashes and more strongly contacting the newly developed surfaces to each other, it may be applied a higher pressure at the end of the welding step.

Further, if the vicinity of the interface to be welded 6 has reached the desired welding temperature, the timing of stopping the temperature raise by the external heating means is not particularly limited but it is preferable to stop immediately after the temperature reaches the welding temperature. By shortening the heating time as much as possible, it is possible to suppress the formation of the heat affected zone in the vicinity of the interface to be welded.

(2) Solid State Welding Apparatus for Metallic Materials

Figure 5:
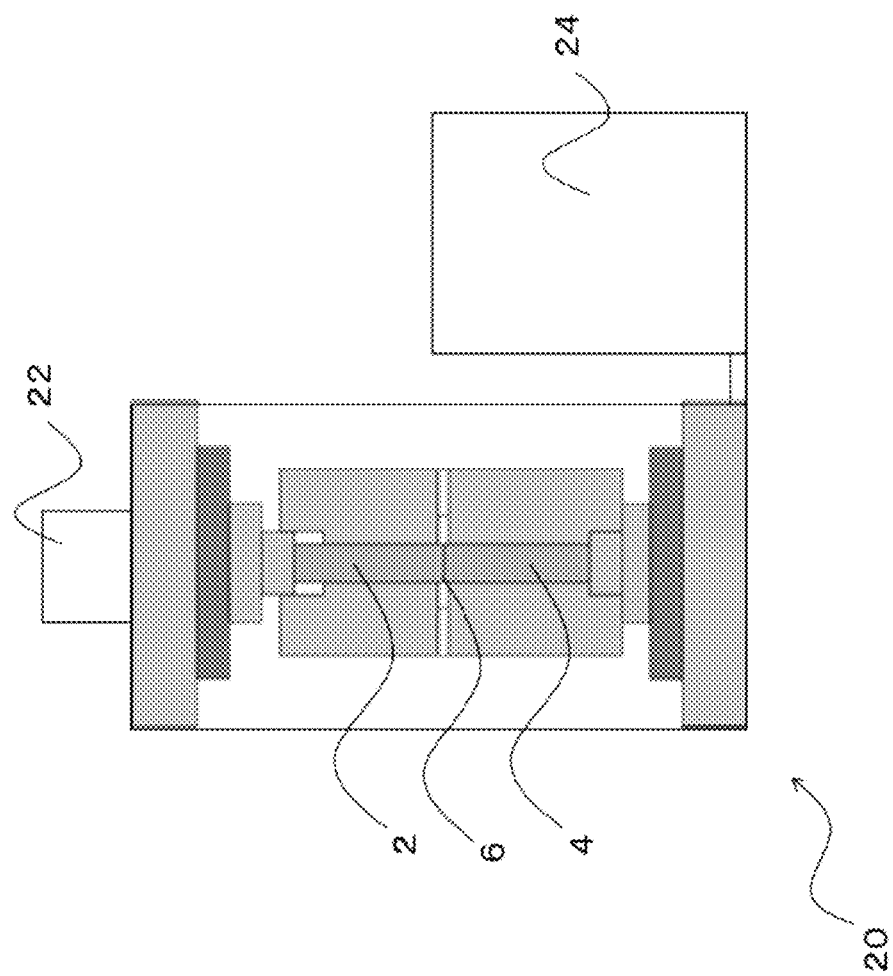
FIG. 5 is a schematic diagram showing an embodiment of a solid phase welding apparatus for metallic materials of the present invention.

FIG. 5 is a schematic diagram showing an embodiment of a solid phase welding apparatus for metallic materials of the present invention. The solid phase welding apparatus for metallic materials 20 includes the pressurizing mechanism 22 for contacting the one of material to be welded 2 into the other of material to be welded 2 to form the interface to be welded 6 and for applying a pressure P in a direction substantially perpendicular to the interface to be welded 6, and the power supply mechanism 24 for flowing electric current from the one material to be welded 2 (or the other material to be welded 4) to the other material to be welded 4 (or the one material to be welded 2) via the interface to be welded 6 to raise the temperature of the vicinity of the interface to be welded 6.

The solid phase welding apparatus for metallic materials 20 is a simple one having a pressurizing mechanism 22 and the power supply mechanism 24, and there is no need to have a rotation mechanism which the friction welding apparatus has and a linear sliding mechanism which the linear friction welding apparatus has. As a result, the structure can be simplified and the price can be greatly reduced.

The pressurization mechanism 22 can control the pressure P in the range of 100 to 450 MPa, and the power supply mechanism 24 can raise the temperature in the vicinity of the interface to be welded 6 from 500 to 1000° C. A conventional resistance spot welding machine or a seam welding machine can also achieve power supply and pressure application to the region to be welded. The power supply is a means for raising the temperature higher for the purpose of melting the material to be welded, whereas, the pressure application is can be remained to have a low value to the extent that ensures close contact between the materials to be welded.

Further, in the solid phase welding apparatus for metallic materials 20 of the present invention, it is preferable that, by setting of the desired welding temperature, the pressure becomes equal to the flow stress of the one material to be welded and/or the other material to be welded at the welding temperature. Here, the flow stress at each temperature is preferably measured in a state close to the situation occurring during actual welding and, for example, it is possible to use a value obtained in the high-temperature tensile test at each temperature. Since the flow stress depends on the strain rate, it is preferable to make the tensile speed of the high-temperature tensile test close to the situation in the welding as much as possible.

Temperature dependence of the flow stress is inherent to each metallic material and, if the solid phase welding apparatus for metallic materials 20 has a database containing the flow stress at each temperature, it is possible to determine the corresponding pressure by setting the type and the desired welding temperature of the metallic material, as shown in FIG. 3. Incidentally, it is preferable to record or store a database of at least iron-based material and titanium alloy in the solid phase welding apparatus for metallic materials 20.

Although representative embodiments of the present invention have been described above, the present invention is not limited to these, and various design modifications are possible, and all of these design modifications are included in the technical scope of the present invention.

Example

Figure 6:
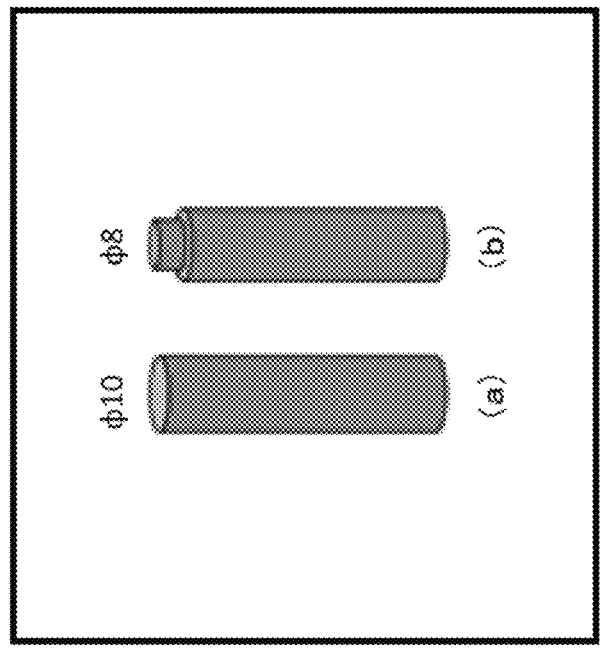
FIG. 6 is a schematic view of a round rod used as a material to be welded.

By using a carbon steel (JIS-S45C) having a ferrite-pearlite structure, there were obtained: a material to be welded (a) having the shape of a round rod of which the diameter was 10 mm and; a material to be welded (b) having the shape of a round rod of which the diameter was 10 mm and the end portion was lathe processed to be a convex shape of which the diameter was 8 mm. In addition, the surface to be welded was processed by a lathe and then degreased with the use of acetone. A schematic diagram of each round bar is shown in FIG. 6.

Figure 7:
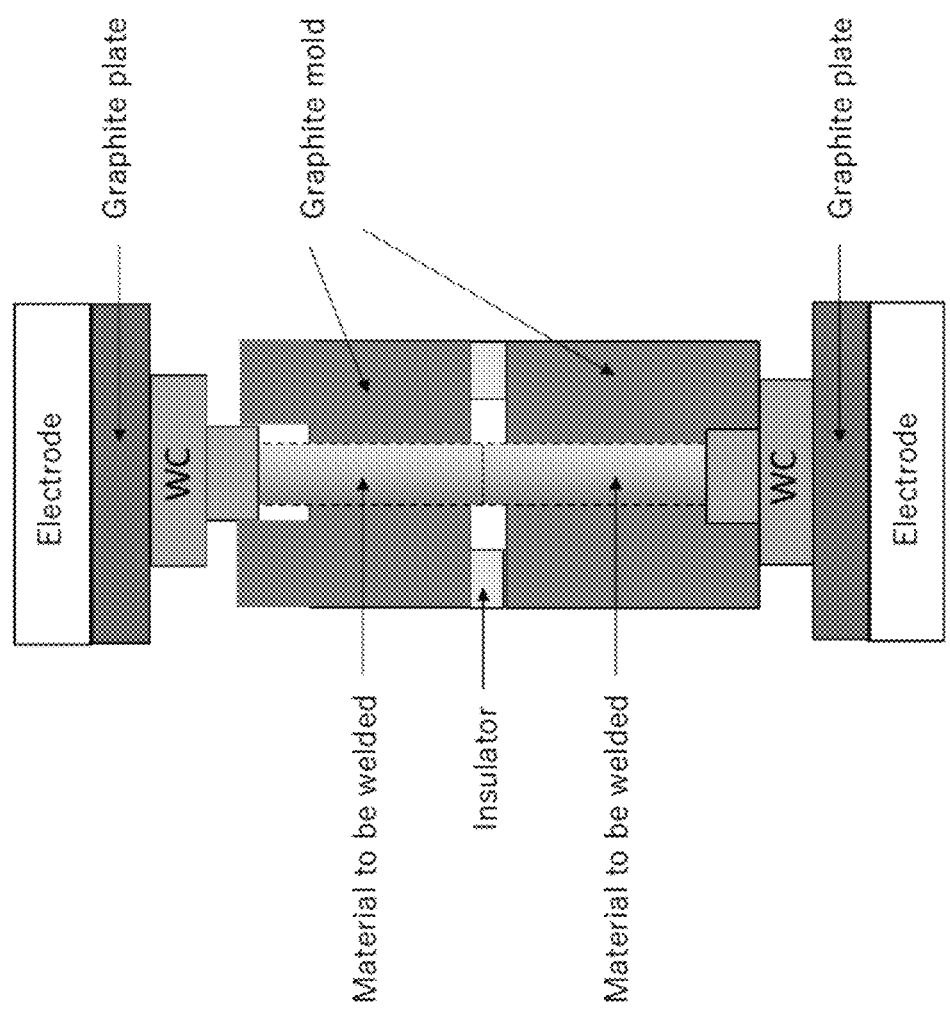
FIG. 7 is a schematic diagram of a welding status in the embodiment.
Figure 8:
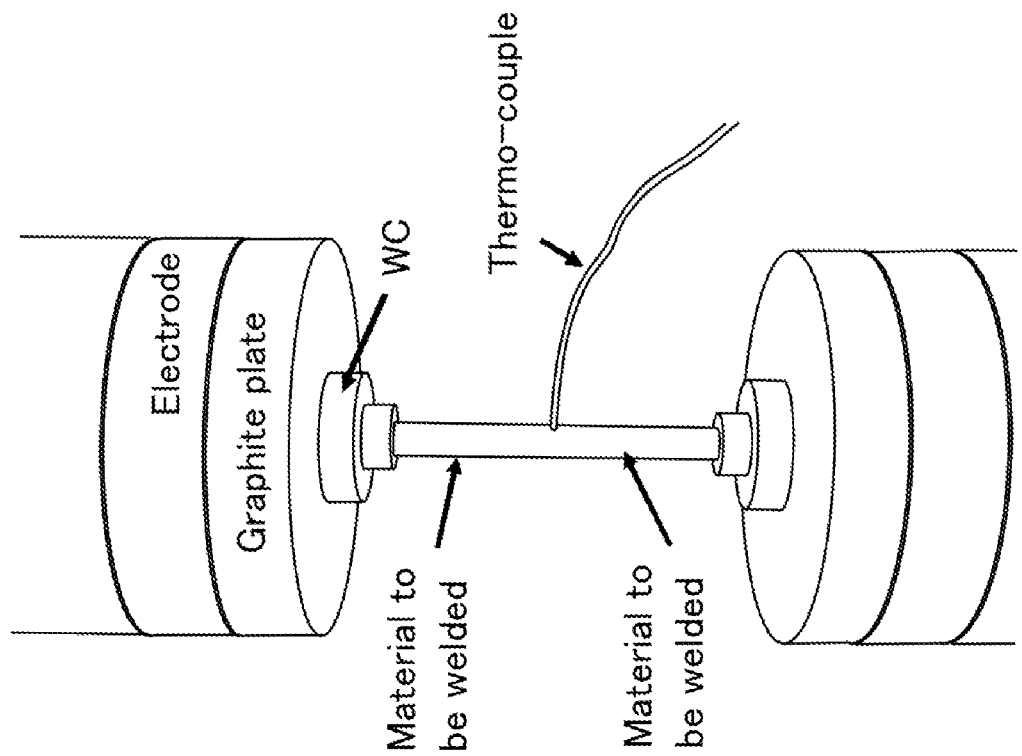
FIG. 8 is an external photograph showing the arrangement status of the material to be welded in the embodiment.

A schematic view of the welding situation is shown in FIG. 7 and FIG. 8 shows the arrangement situation of the actual materials to be welded, respectively. The materials to be welded are interposed between electrodes, the graphite plates and the WC fixing portions from the top and the bottom in a state of abutting their end surfaces, and the portions except for the vicinity of the interface to be welded are covered with graphite molds. The pressure application in the first step and the electric current flowing in the second step are performed through the upper and lower electrodes and the like. Further, an insulator is disposed around the interface to be welded. Incidentally, FIG. 8 shows the state in which the graphite molds and the insulator are removed.

For the welding conditions, the pressure applied in the first step was set to 250 MPa and the electric current value used in the second step was set to be in the range of 2000 to 4000 A. Incidentally, at the time when the burn-off length became 2 mm, the electric current flowing was ended and the pressure was released. Here, the pressure applied in the first step (250 MPa) was set so that the welding temperature became equal to or less than point $A_1$ of the material to be welded (JIS-S45C).

Table 1 shows the tensile properties, etc. of the joints obtained under the respective welding conditions. The welding strength increases as the current density increases, and the tensile strength becomes about 800 MPa when the current density is 51.0 A/mm$^2$ and equal to that of the base metal (about 830 MPa) when the current density is 79.6 A/mm$^2$. Incidentally, the temperature near the interface to be welded in each welding condition using a thermocouple (welding temperature) was measured, and it was about 700° C.

TABLE 1

| Shape of material to be welded | Current (A) | Current Density (A/mm$^2$) | Welding Time(s) | Tensile Strength (MPa) | Elongation (%) | Fracture Position |
|---|---|---|---|---|---|---|
| (a) | 2000 | 25.5 | 11.0 | 557.3 | 5.4 | Interface to be welded |
| (a) | 3000 | 38.2 | 4.5 | 655.0 | 6.9 | Interface to be welded |
| (a) | 4000 | 51.0 | 2.6 | 798.9 | 12.5 | Interface to be welded |
| (b) | 2000 | 39.8 | 5.0 | 647.1 | 5.5 | Interface to be welded |
| (b) | 4000 | 79.6 | 1.3 | 827.3 | 12.0 | Base material |
| Base material | | | | 830.0 | 17.0 | |

Figure 9:
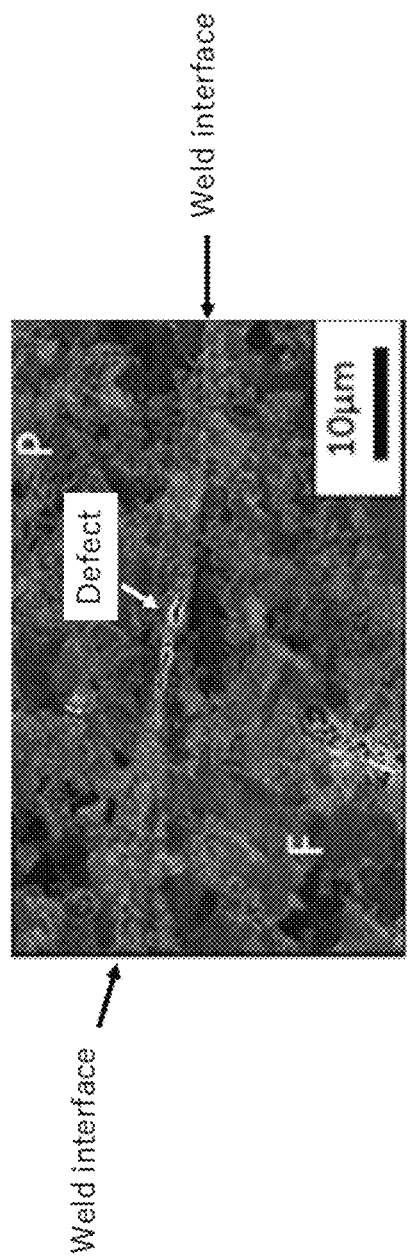
FIG. 9 is a SEM photograph of the welded interface obtained by using the current density of 25.5 A/mm$^2$.
Figure 10:
FIG. 10 is a SEM photograph of the welded interface obtained by using the current density of 79.6/mm$^2$.

The SEM-photograph of the welded interface which was obtained under the welding condition where the current density was low as 25.5 A/mm$^2$ is shown in FIG. 9. Defects (unwelded region) existed in the welded interface, and the ratio of defects to the entire welded interface was about 1%. In contrast, there was not observed defects (FIG. 10) in the welded interface which was obtained by the current density of 79.6 A/mm$^2$ and which showed the same strength as that of the base metal. It is considered that the temperature raising rate increases with an increase in the current density and the interface to be welded deformed more locally to facilitate the welding. Incidentally, the vicinity of the welded interface has a structure consisting of ferrite (F) and pearlite (P), and there are not observed martensite or bainite.

Here, focusing on the welding time, it is 2.6 seconds in case of a current density 51.0 A/mm$^2$ when the tensile strength has reached about 800 MPa, and it is 1.3 seconds in case of a current density 79.6 A/mm$^2$ when the tensile strength has reached to the strength of the base material, and a good joint is formed when the welding time is 3 seconds or less (in particular 2 seconds or less).

Figure 11:
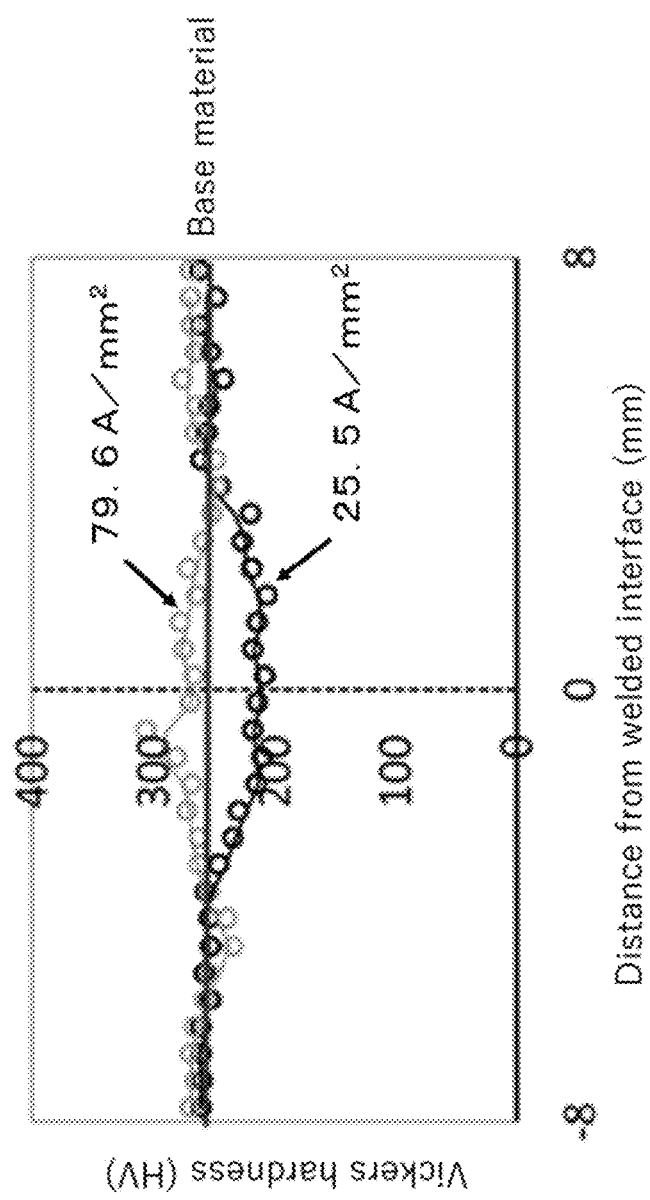
FIG. 11 is a graph showing the Vickers hardness distribution in the vicinity of the welding interface (direction perpendicular to the welded interface).

The Vickers hardness distributions in the vicinity of the welded interface for the case of the current density of 25.5 A/mm$^2$ and 79.6 A/mm$^2$ (perpendicular to the welded interface) are shown in FIG. 11. Since the welding time becomes long in the case of the current density of 25.5 A/mm$^2$, the softened portion due to the heat effect is formed, but the softened portion is not observed when the welding time is short in the case of the current density of 79.6 A/mm$^2$. Further, in both welding conditions, since the welding temperature is equal to or less than the point $A_1$ of the carbon-steel (JIS-S45C), no remarkable hardening caused by the formation of martensite or bainite occurs.

Next, the burn-off length was set to 6 mm, the pressure applied in the first step was set to 250 MPa, and the electric current value used in the second step was set in the range of 2000 to 4000 A to obtain various joints. Incidentally, in addition to the two types of round rods shown in FIG. 6, a convex round rod obtained by lathing the diameter of the end portion to 7 mm was also used as the material to be welded.

Figure 12:
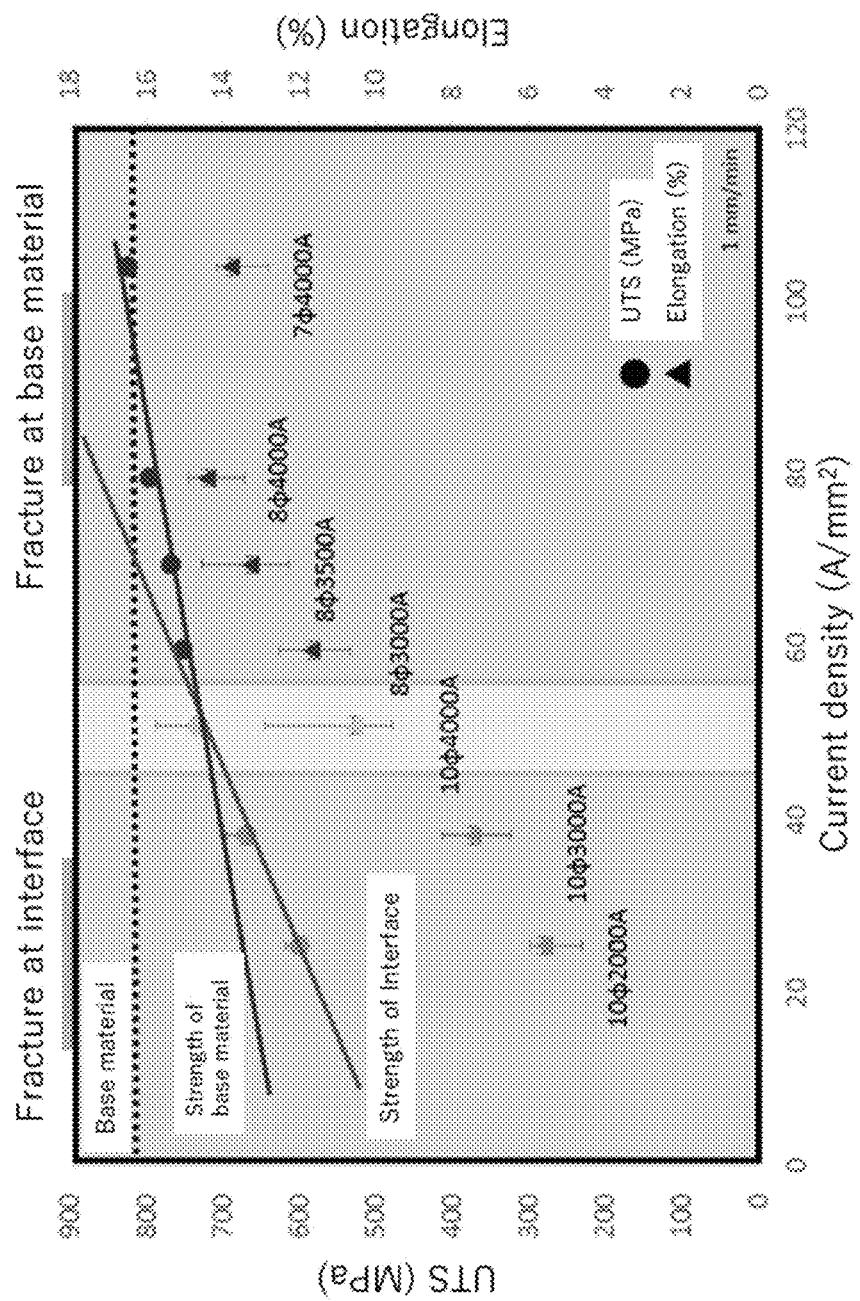
FIG. 12 is a graph showing the fracture position in the tensile properties and tensile test of each joint obtained in Examples.

The fracture position in the tensile properties and tensile test of each joint obtained is shown in FIG. 12. It can be seen that the current density 50.0 A/mm$^2$ is the boundary between the breakage of the base material and the breakage at the interface, and good joints are obtained when the current density becomes equal to or more than 60.0 A/mm$^2$ which break the base metal.

Figure 13:
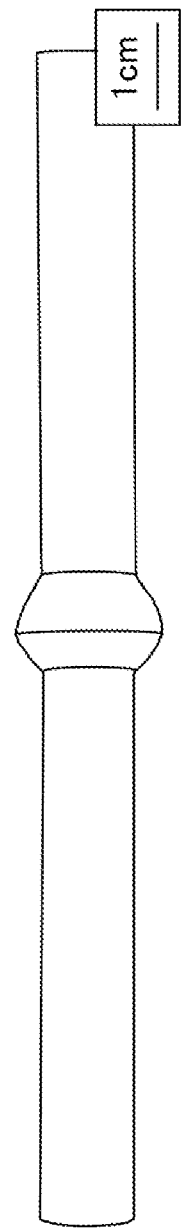
FIG. 13 is an overview photograph of the joint obtained by using a current value of 2000 A.
Figure 14:
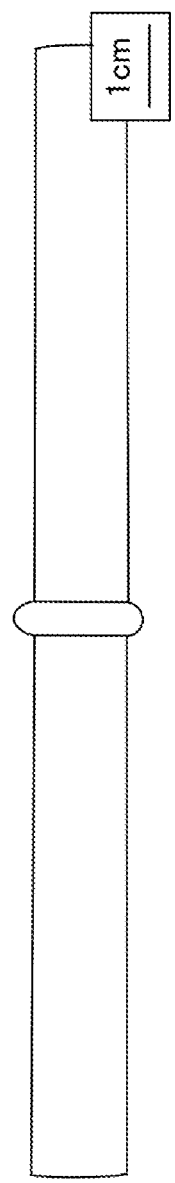
FIG. 14 is an overview photograph of the joint obtained by using a current value of 4000 A.

FIG. 13 shows an overview photograph of the joint obtained under the welding conditions of the burn-off length: 6 mm, the pressure: 250 MPa, and the electric current value: 2000 A, and FIG. 14 shows the overview photograph of the joint obtained under the welding conditions of the burn-off length: 6 mm, the pressure: 250 MPa, and the electric current value: 4000 A, respectively. It can be seen that, by increasing the electric current value (increasing the current density), only the vicinity of the welded interface was locally deformed largely and the area of the interface to be welded was sufficiently enlarged to form a newly developed surface.

Figure 15:
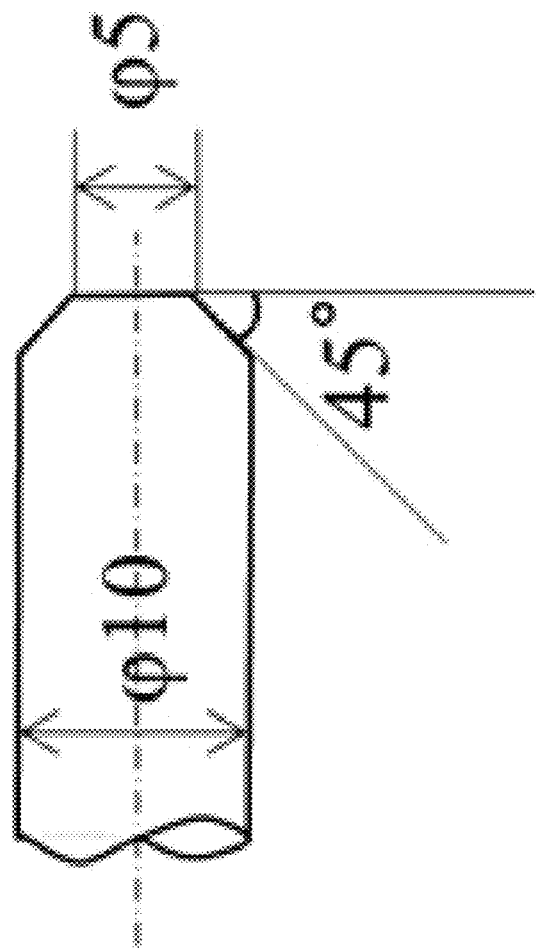
FIG. 15 is a schematic view of a tapered shape formed on the end portion of the material to be welded.

Next, with respect to the round rod having the diameter of 10 mm (a), the end portion forming the interface to be welded was lathed into the tapered shape as shown in FIG. 15 to obtain a material to be welded. Here, without covering and bounding the material to be welded with a graphite mold, the electric current path was restricted by abutting the materials to be welded, of which the tips were processed into a tapered shapes, to each other, and only the temperature of the vicinity of the interface to be welded was raised.

Figure 16:
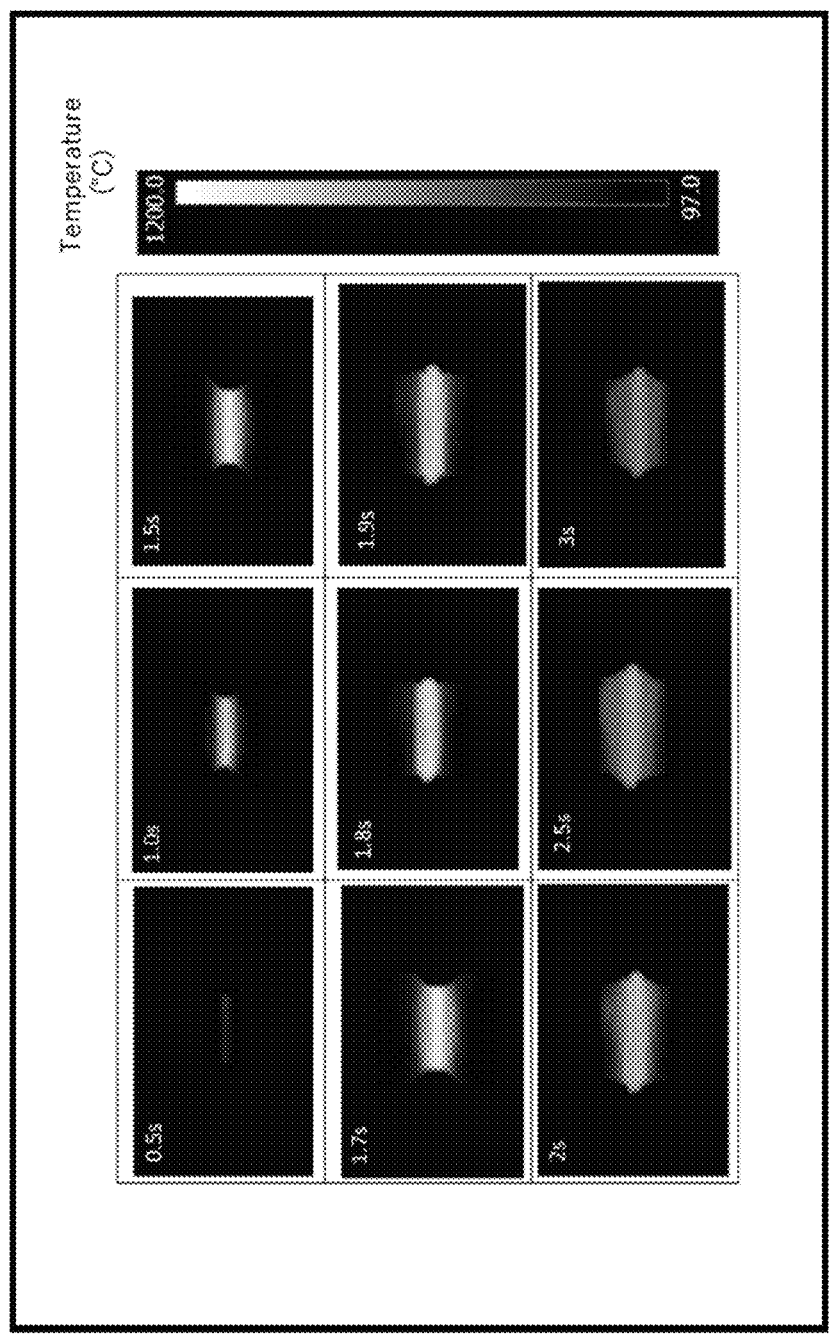
FIG. 16 is a thermal image showing the temperature change of the material to be welded during welding.

Under the welding conditions of the burn-off length: 4 mm, the pressure: 250 MPa, and the current value: 3000 A, joints were obtained when the interface to be welded was buffed or lathed. Incidentally, the welding temperature was measured using a thermal image camera, and the temperature rise was confirmed only in the vicinity of the interface to be welded. The temperature change of the material to be welded at each welding time is shown in FIG. 16.

Figure 17:
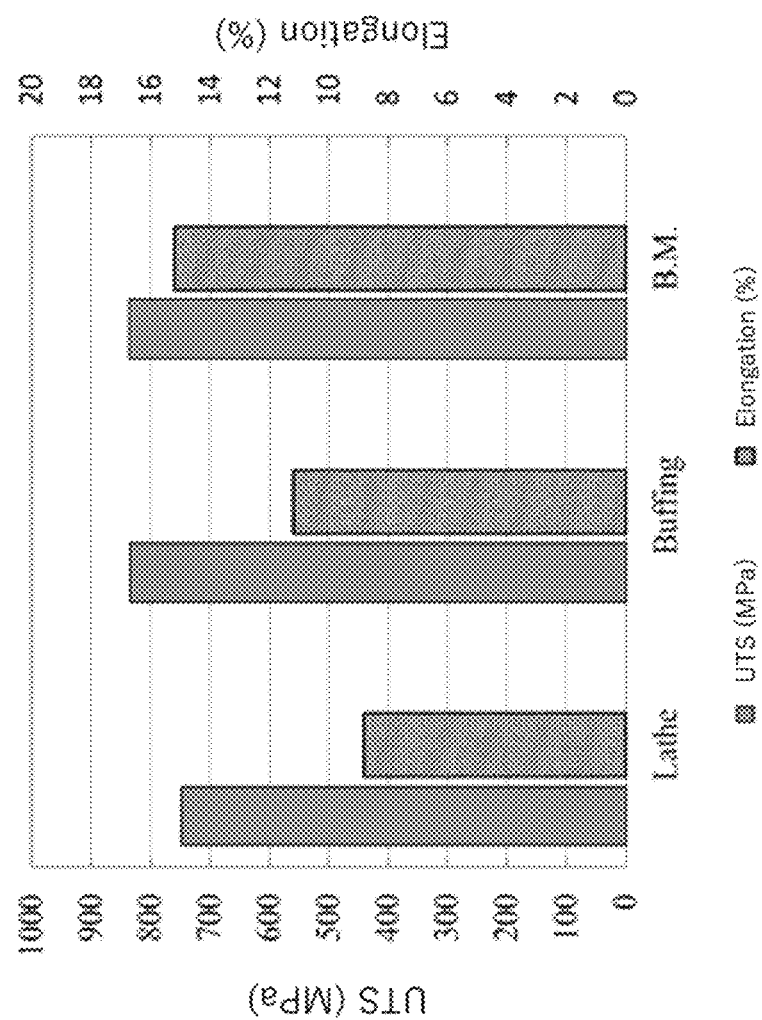
FIG. 17 is a graph showing the tensile properties of the joint obtained from the materials to be welded having an end portion of a tapered shape.
Figure 18:
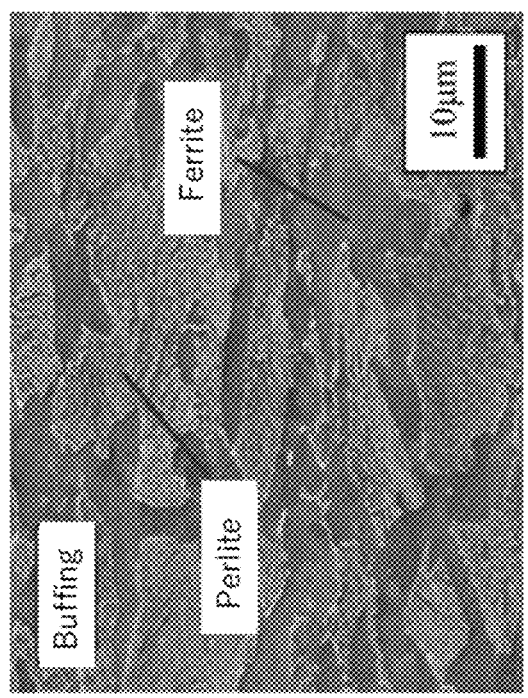
FIG. 18 is a SEM photograph of the welded interface of the joint obtained by carrying out buffing to the interface to be welded.

The tensile characteristics of the obtained joint is shown in FIG. 17. The tensile strength and the elongation are both improved by performing buffing on the interface to be welded, and the tensile strength is equal to that of the base material. The SEM observation of the welded interface of the joint obtained by performing buffing to the interface to be welded was carried out, and there is no unwelded portion and a good welded portion was formed as shown in FIG. 18. Also, it can be seen that the structure of the welded portion is a ferrite-perlite structure and the welding is achieved below point $A_1$.

Figure 19:
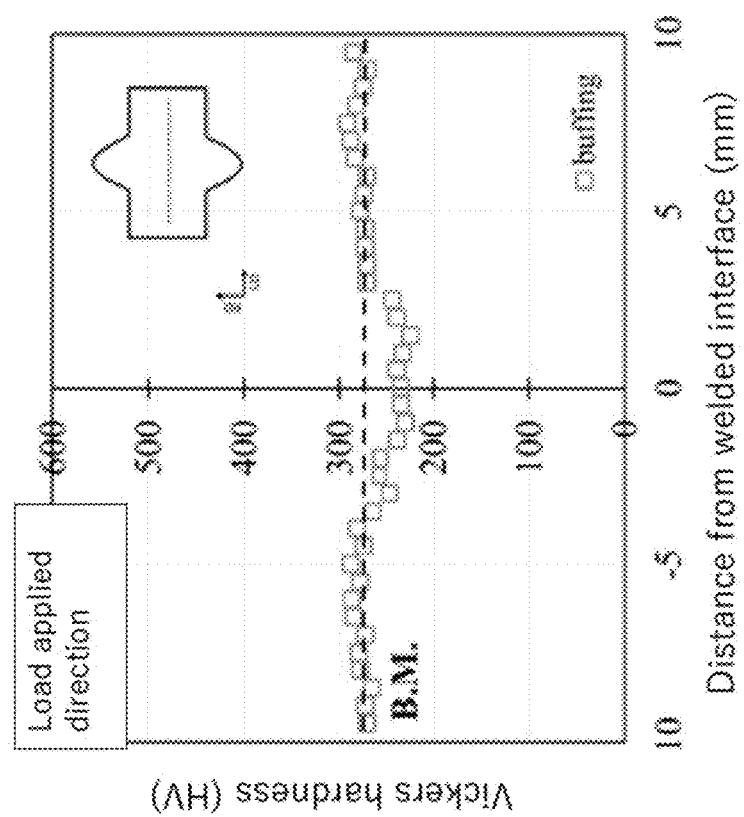
FIG. 19 is a graph showing the hardness distribution of the welded portion of the joint obtained by carrying out buffing (in the direction of load application).
Figure 20:
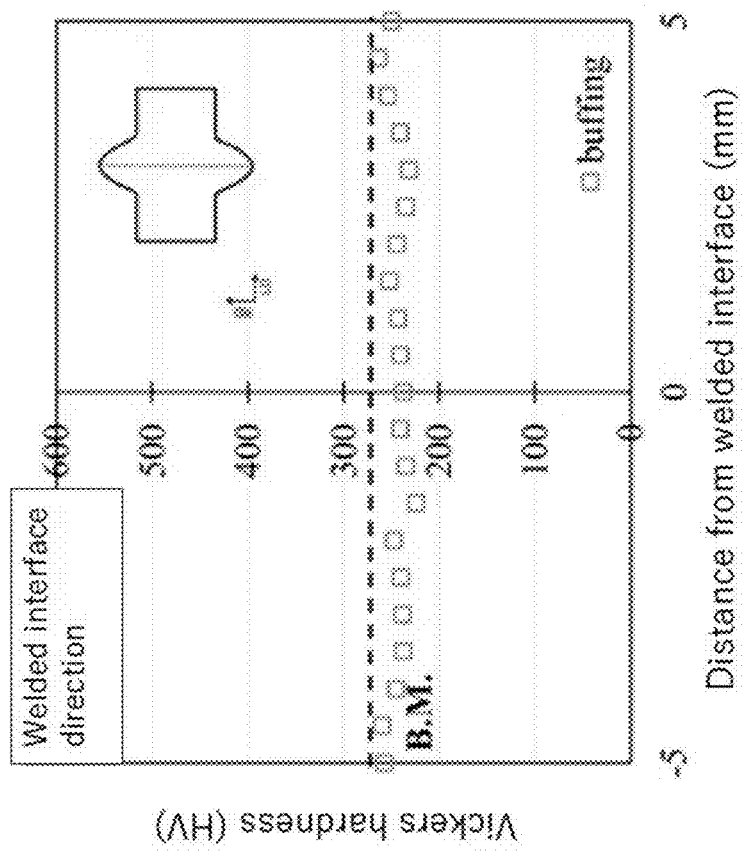
FIG. 20 is a graph showing the hardness distribution of the welded portion of the joint obtained by carrying out buffing (in the direction of welded interface).

The Vickers hardness was measured for the welded portion of the joint obtained by performing buffing. The hardness distribution in the load application direction was shown in FIG. 19 and the hardness distribution in the welded interface direction was shown in FIG. 20. It is confirmed that the uniform hardness distribution is obtained in the welded interface direction and, even when using a tapered material, the heat input during the welding was uniform with respect to the welded interface. Incidentally, from the measurement results of the load application direction, it can be seen that the softening due to the heat effect hardly occurs. Although a slight softening is observed at the welded portion, it seems that is caused by the decrease in dislocation density due to recrystallization.

Figure 21:
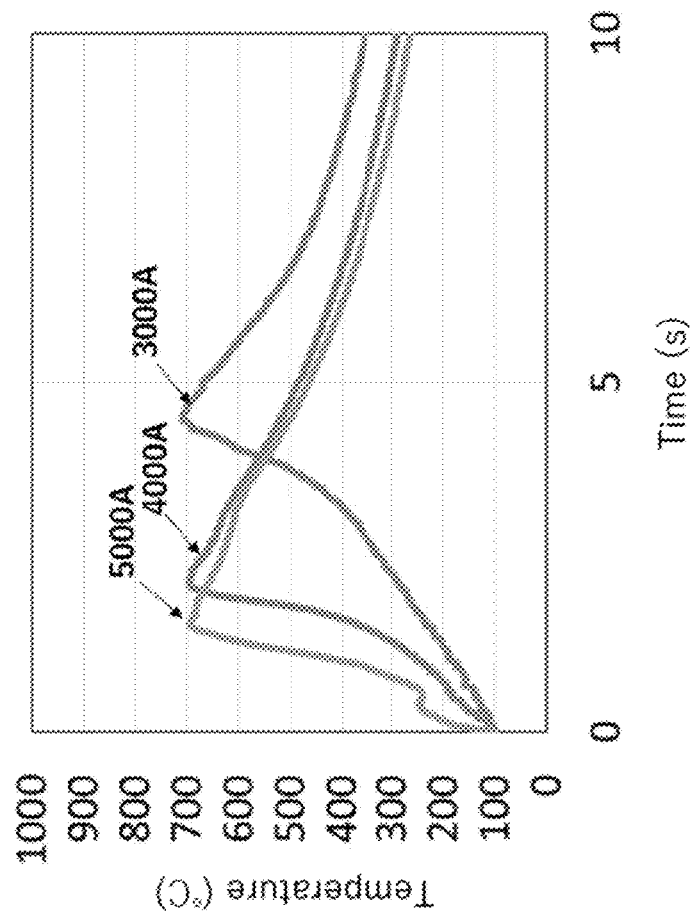
FIG. 21 is a graph showing the relationship between the welding time and the welding temperature when using different current values.

Next, a round rod (a) having the diameter of 10 mm was used as a material to be welded, and a joint was obtained with the burn-off length of 4 mm, the pressure of 250 MPa and the electric current value of 3000 to 5000 A. The relationship between the welding time and the welding temperature is shown in FIG. 21. Incidentally, the welding temperature was measured using a thermal image camera. It can be seen that, although the temperature raising rate is different depending on the current value, the welding temperature has become about 700° C. regardless of the current value, and the welding temperature is controlled by the applied pressure.

Figure 22:
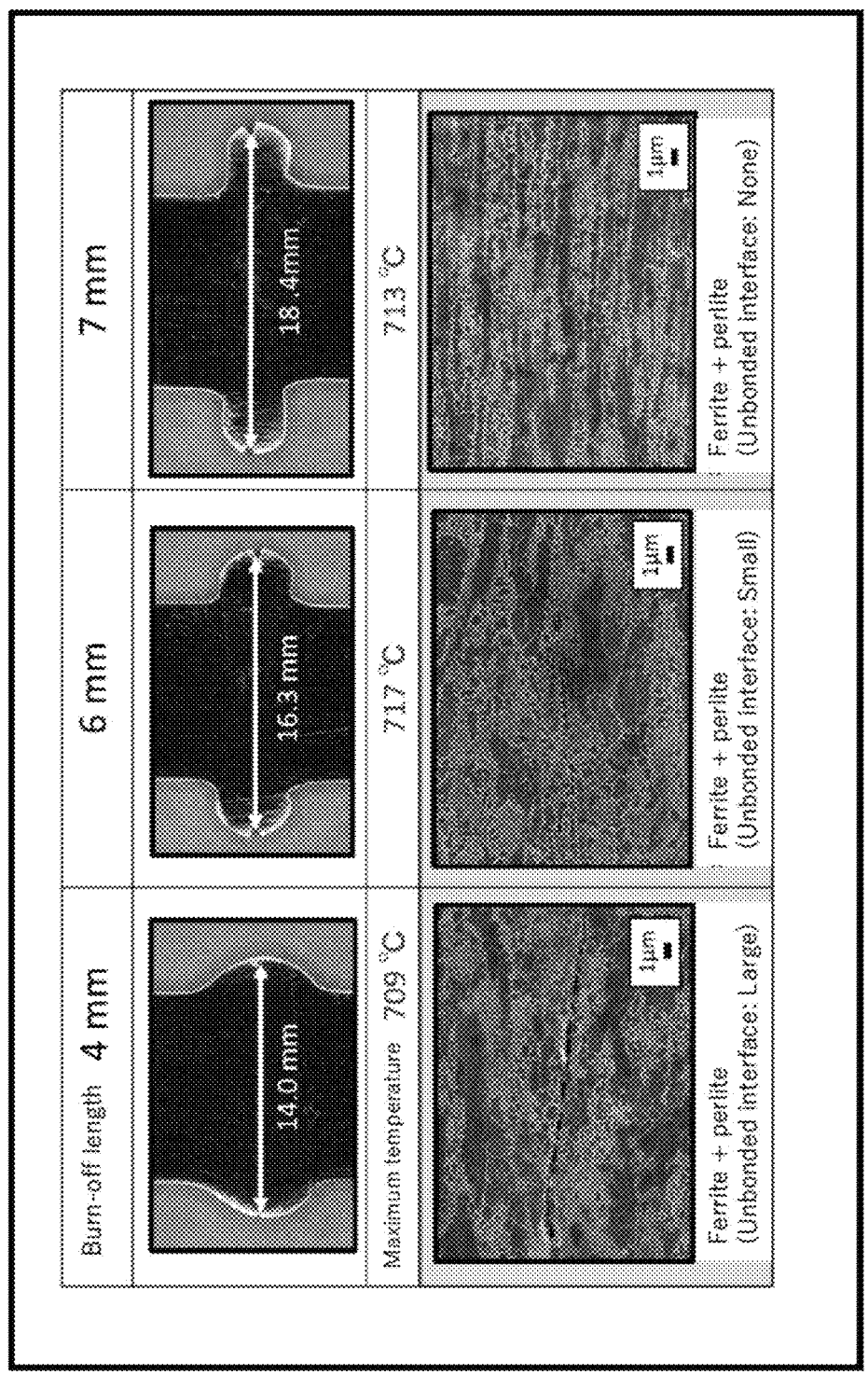
FIG. 22 shows cross-sectional photographs of the joints each obtained with each burn-off length and microstructure photographs of the welded interface.

Next, a round rod (a) having the diameter of 10 mm was used as a material to be welded, and a joint was obtained with the pressure: 250 MPa, the electric current value: 300 A and the burn-off length: 4 to 7 mm. The cross-sectional photograph of the joint and the microstructure of the welded interface obtained in each burn-off length are shown in FIG. 22. When the burn-off length was 7 mm, the area of the welded interface was sufficiently enlarged, and no unwelded portion was observed.

Figure 23:
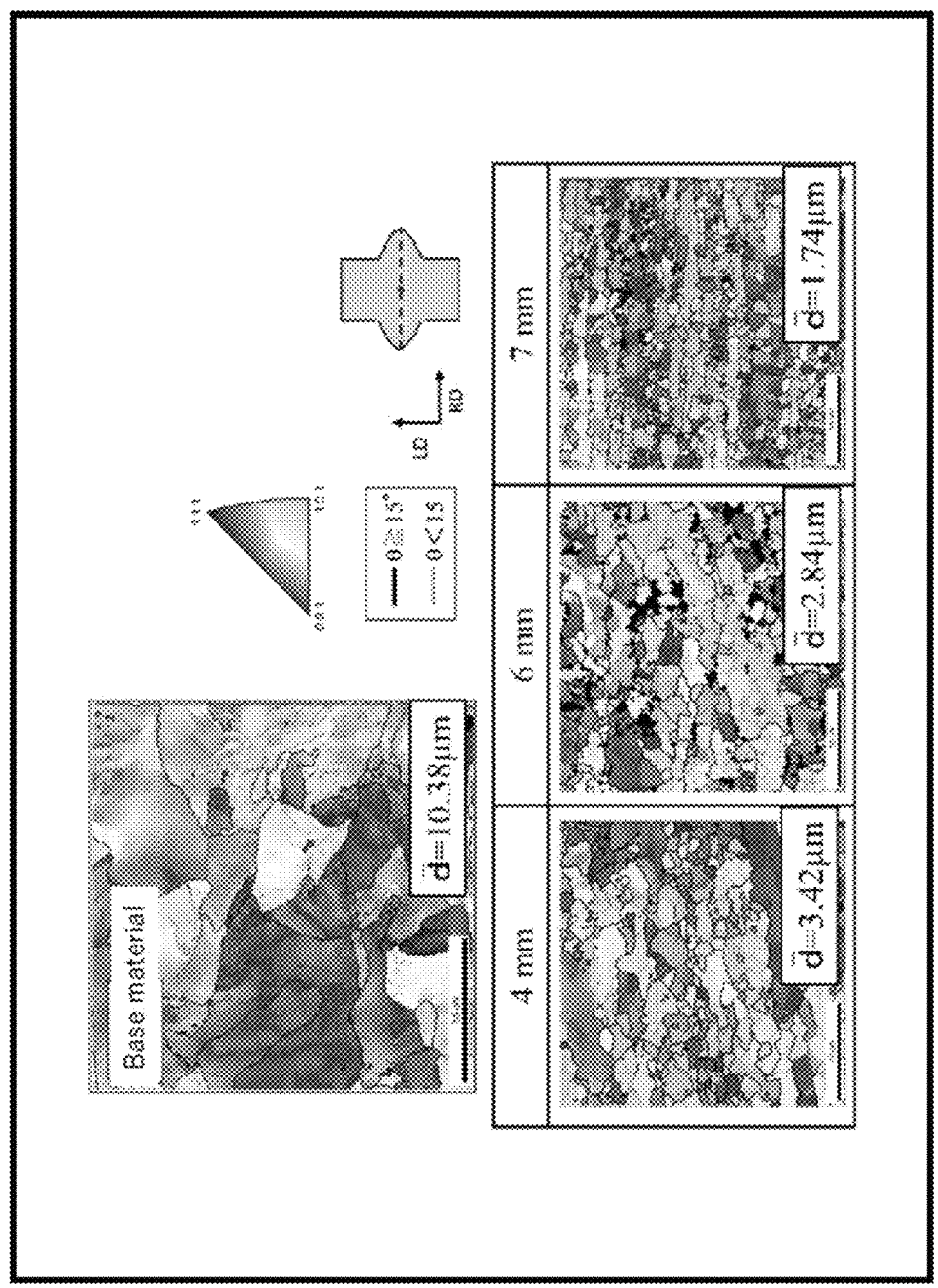
FIG. 23 is a color map of orientation with respect to the cross section of the joint obtained with each burn-off length.
Figure 24:
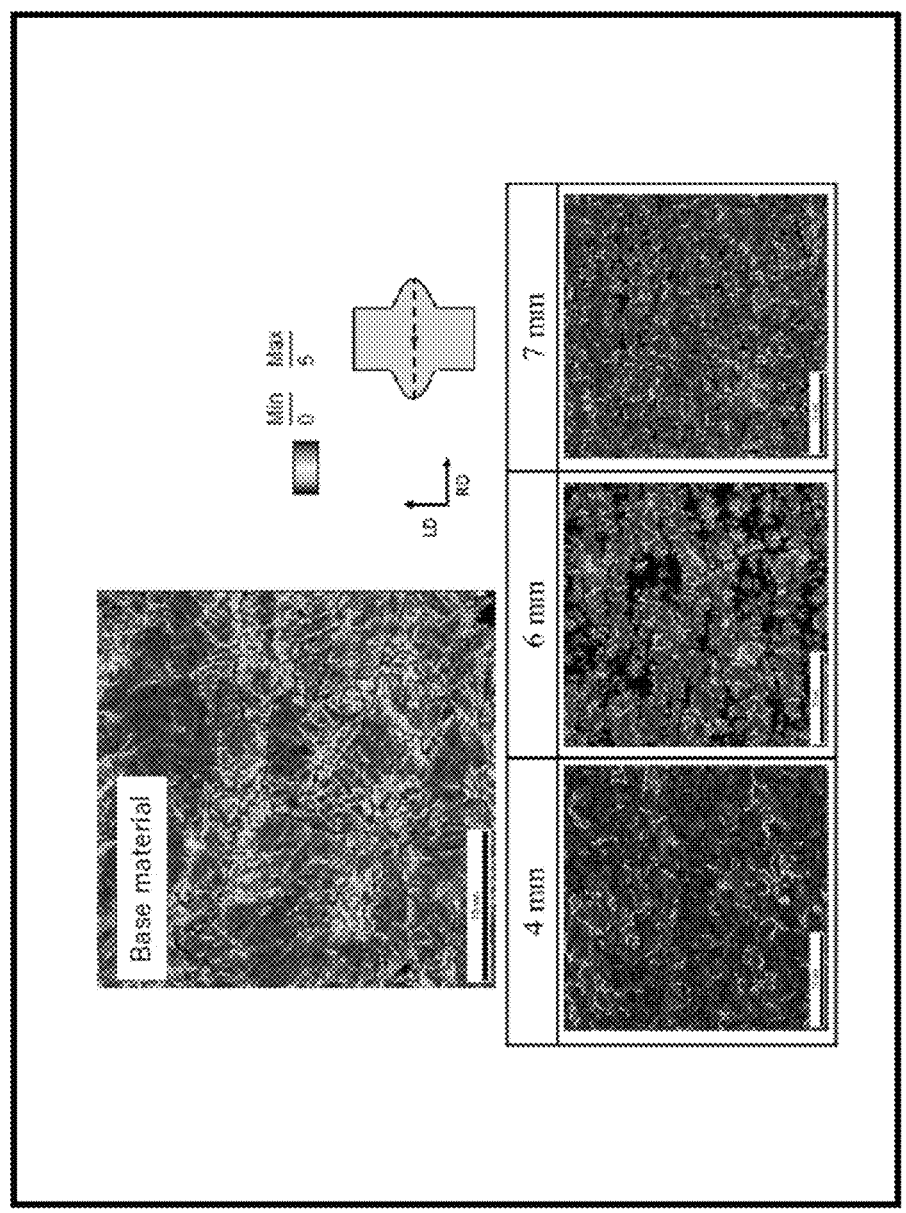
FIG. 24 shows a KAM map of the cross-section of the joint obtained at each burn-off length.

In order to grasp the microstructure of the welded portion in more detail, the microstructure was analyzed using electron beam backscattering diffraction. Specifically, the electron beam backscattering diffraction pattern was obtained by tilting the surface of the sample to be observed by 70° with respect to the electron beam and scanning the electron beam with a step size of 0.02 μm and, then, analyzed to obtain information on the crystal system and crystal orientation of the minute region. OIMs (Orientation Imaging Microscopy) made by TSL were used for the collection and analysis of the data. The color maps of orientation and KAM maps for the cross-sections of the joints obtained for each burn-off length are shown in FIGS. 23 and 24, respectively.

From the color map of orientation, it can be seen that the crystal grains are miniaturized by recrystallization along with an increase in the burn-off length, and when the burn-off length is 7 mm, the crystal grains have a fine recrystallization structure with an average grain diameter of 1.74 μm. The KAM map also shows that the dislocation density at the welded portion decreases compared with that of the base metal, and increases with the increase of the burn-off length.

Figure 25:
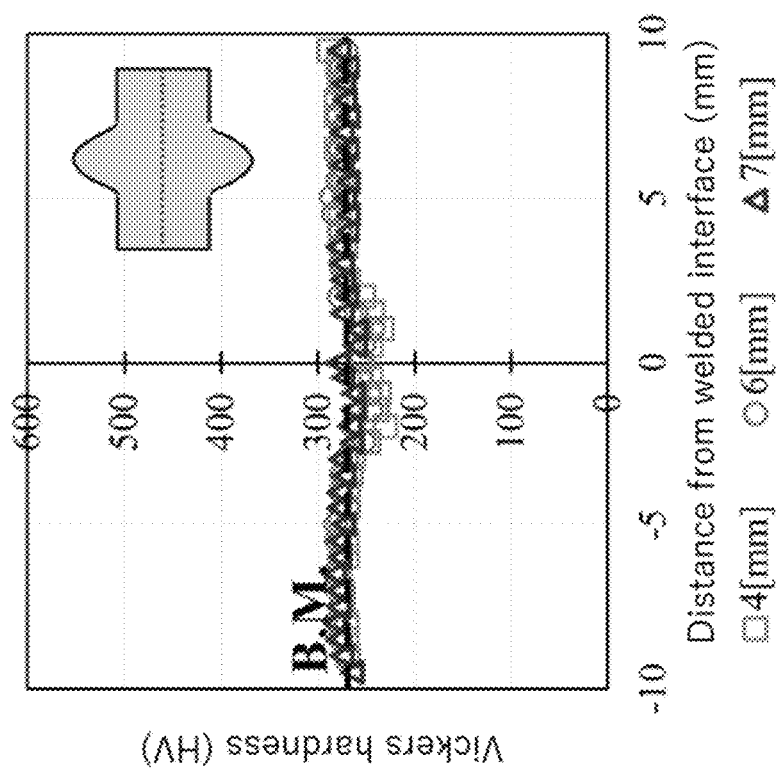
FIG. 25 shows a Vickers hardness distribution in the cross section of the welded portion of the joint obtained at each burn-off length (in the direction perpendicular to the welded interface).
Figure 26:
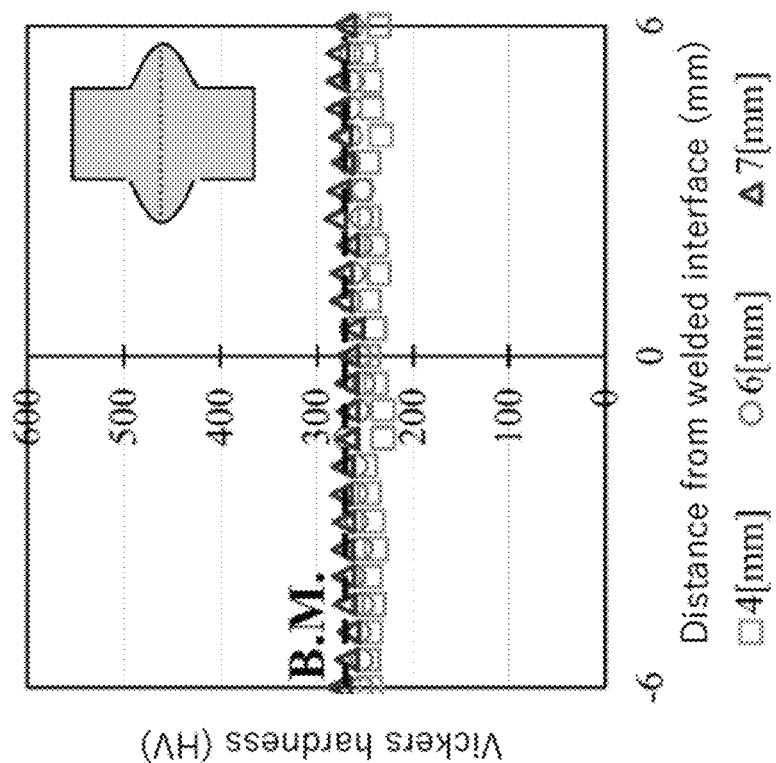
FIG. 26 shows a Vickers hardness distribution in the cross section of the welded portion of the joint obtained at each burn-off length (in the direction of the welded interface).

The Vickers hardness distribution at the cross section of the welded portion of the joint obtained at each burn-off length is shown in FIGS. 25 and 26. FIG. 25 is a Vickers hardness distribution in the direction perpendicular to the welded interface and FIG. 26 is a Vickers hardness distribution in the direction of the welded interface. From FIG. 25, the increase of the burn-off length, it can be seen that the softening due to the heat effect is suppressed. Further, from FIG. 26, it is shown that the heat input in the direction of the welded interface is uniform and is particularly uniform when the burn-off length is large.

Figure 27:
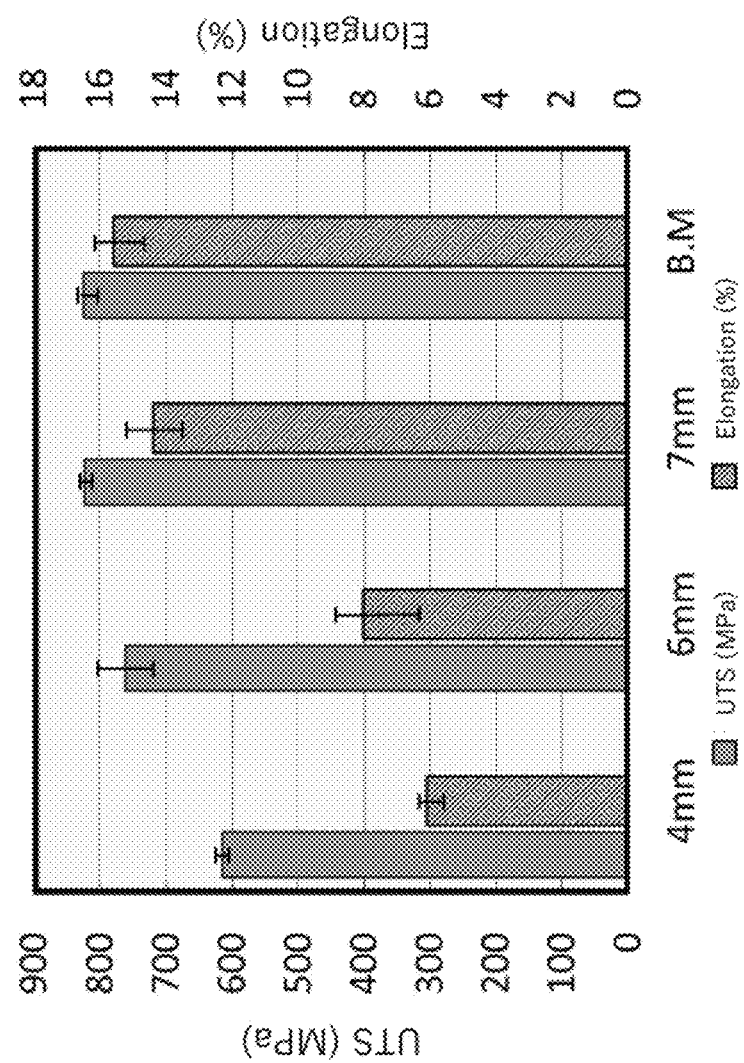
FIG. 27 shows tensile test results of the joint obtained at each burn-off length and the base material.

The tensile test results of the joint and the base material obtained at each burn-off length are shown in FIG. 27. The strength and elongation with the increase of the burn-off length is improved and, if the burn-off length is 7 mm, the strength and elongation equivalent to the base material are obtained.

EXPLANATION OF NUMERALS

2 . . . One material to be welded
4 . . . Other material to be welded

6 . . . Interface to be welded
10 . . . Heat generating material
20 . . . Solid phase welding apparatus for metallic materials
22 . . . Pressurizing mechanism
24 . . . Power supply mechanism

The invention claimed is:

1. A solid phase welding method for metallic materials comprising,
   a first step of forming an interface by abutting an first end portion of a first material to be welded and a second end portion of a second material to be welded and applying a pressure in a direction substantially perpendicular to the interface,
   a second step of raising a temperature of a vicinity of the interface a welding temperature by an external heating means,
   wherein the welding temperature is set before the second step of raising the temperature based on a yield stress of the first material and/or the second material generated by the pressure applied to the interface in the first step, in which the pressure as applied is equal to or more than the yield strength of the first material and/or the second material at the welding temperature, and equal to or less than a tensile strength of the first material and/or the second material at the welding temperature.

2. The solid phase welding method for metallic materials in accordance with claim 1, wherein an electric heating is used as the external heating means.

3. The solid phase welding method for metallic materials in accordance with claim 2, wherein a heat generating material having an electrical resistance value higher than the first material and the second material is provided between the first end of the first material and the second end of the second material.

4. The solid phase welding method for metallic materials in accordance with claim 1, wherein the pressure is set to a flow stress of the first material and/or the second material.

5. The solid phase welding method for metallic materials in accordance with claim 1, wherein the first material and/or the second material comprises an iron-based metal.

6. The solid phase welding method for metallic materials in accordance with claim 5, wherein the welding temperature is set to be equal to or lower than point $A_1$ of the iron-based metal.

7. The solid phase welding method for metallic materials in accordance with claim 1, wherein the first material and/or the second material comprises titanium or titanium alloy.

8. The solid phase welding method for metallic materials in accordance with claim 7, wherein the welding temperature is set to be equal to or below a β transus temperature of titanium or titanium alloy.

9. The solid phase welding method for metallic materials in accordance with claim 2, wherein an area S1 of the interface to be welded is smaller than a cross-sectional area S2 of the first material and the second material in a direction substantially perpendicular to the direction of application of the pressure.

10. The solid phase welding method for metallic materials in accordance with claim 9, wherein the area S1 is continuously reduced in a direction toward to the interface to be welded at the end portion of the one material to be welded and/or the other material to be welded.

* * * * *